(12) United States Patent
Pavel et al.

(10) Patent No.: US 9,162,171 B2
(45) Date of Patent: Oct. 20, 2015

(54) METHOD, SYSTEM, AND APPARATUS FOR SEPARATION IN PROCESSING OF FEEDSTOCKS

(75) Inventors: Stephen K. Pavel, Kingwood, TX (US); Michael A. Silverman, Houston, TX (US); Steven A. Kalota, Irvine, CA (US)

(73) Assignee: Ivanhoe HTL Petroleum Ltd., Houston, TX (US)

( * ) Notice: Subject to any disclaimer, the term of this patent is extended or adjusted under 35 U.S.C. 154(b) by 709 days.

(21) Appl. No.: 13/341,854

(22) Filed: Dec. 30, 2011

(65) Prior Publication Data
US 2012/0167767 A1 Jul. 5, 2012

Related U.S. Application Data

(60) Provisional application No. 61/428,316, filed on Dec. 30, 2010.

(51) Int. Cl.
| | |
|---|---|
| *B01D 45/12* | (2006.01) |
| *B01D 45/16* | (2006.01) |
| *B01D 50/00* | (2006.01) |
| *B04C 5/04* | (2006.01) |
| *B04C 5/15* | (2006.01) |
| *C10B 49/22* | (2006.01) |
| *C10B 55/10* | (2006.01) |

(52) U.S. Cl.
CPC ............... *B01D 45/12* (2013.01); *B01D 45/16* (2013.01); *B01D 50/002* (2013.01); *B04C 5/04* (2013.01); *B04C 5/15* (2013.01); *C10B 49/22* (2013.01); *C10B 55/10* (2013.01); *C10G 2300/40* (2013.01)

(58) Field of Classification Search
CPC ...... B01D 45/16; B01D 50/002; C07C 11/06; C07C 11/04; B01J 8/24
USPC .......... 55/459.1, 428, 429, 432–433; 95/271, 95/216, 219; 208/113, 118, 106, 153, 157, 208/127, 74, 151, 120.01, 120.35; 422/147, 422/144, 145; 96/355, 360
See application file for complete search history.

(56) References Cited

U.S. PATENT DOCUMENTS

| | | | | |
|---|---|---|---|---|
| 3,180,711 A | * | 4/1965 | Aconsky | 422/145 |
| 2002/0112403 A1 | * | 8/2002 | Pope et al. | 48/127.3 |
| 2010/0012595 A1 | | 1/2010 | Yang et al. | |

FOREIGN PATENT DOCUMENTS

| | | |
|---|---|---|
| CN | 101874099 A | 10/2010 |
| WO | WO 2008/007387 A1 | 1/2008 |
| WO | WO 2009/067350 A1 | 5/2009 |

OTHER PUBLICATIONS

WO, International Search Report; International Application No. PCT/US2011/068237, Jul. 9, 2012.

(Continued)

*Primary Examiner* — Dung H Bui
(74) *Attorney, Agent, or Firm* — Orrick, Herrington & Sutcliffe, LLP

(57) ABSTRACT

A method, system, and apparatus for separation in processing of feedstocks are disclosed. According to one embodiment, an apparatus comprises a tubular vessel having a square pipe entry and a vapor outlet, wherein the vapor outlet is positioned at the top of the tubular vessel, and wherein the square pipe entry is tangential to an inner diameter of the tubular vessel; a barrel positioned below the tubular vessel; and a double isolation knife valve positioned between the tubular vessel and the barrel, wherein a stream of gas and solids enters the tubular vessel through the square pipe entry, and wherein the gas and solids are separated by using centrifugal force, and wherein the gas exits the vapor outlet and the solids are collected in the barrel.

4 Claims, 22 Drawing Sheets

(56) References Cited

OTHER PUBLICATIONS

CN, First Chinese Office Action Patent Application No. 201180068825.1, Jul. 9, 2014.

JP, Japanese Office Action Patent Application No. 2013-547711, Jul. 22, 2014.

CO, Columbian Office Action Patent Application No. 13-155.550, Aug. 21, 2014.

* cited by examiner

METHOD, SYSTEM, AND APPARATUS FOR SEPARATION IN PROCESSING OF FEEDSTOCKS

The present application claims the benefit of and priority to U.S. Provisional Application Ser. No. 61/428,316, titled "INERTIAL SEPARATOR FOR USE IN THERMAL PROCESSING OF HEAVY HYDROCARBON FEEDSTOCKS," filed on Dec. 30, 2010, which is hereby incorporated by reference herein in its entirety for all purposes.

FIELD

The present invention generally relates to equipment for rapid thermal processing of viscous oil feedstock. More specifically the present invention is directed to a method, system, and apparatus for separation in processing of feedstocks.

BACKGROUND

Heavy oil and bitumen resources are supplementing the decline in the production of conventional light and medium crude oils, and production from these resources is steadily increasing. Pipelines cannot handle these crude oils unless diluents are added to decrease their viscosity and specific gravity to pipeline specifications. Alternatively, desirable properties are achieved by primary upgrading. However, diluted crudes or upgraded synthetic crudes are significantly different from conventional crude oils. As a result, bitumen blends or synthetic crudes are not easily processed in conventional fluid catalytic cracking refineries. Therefore, in either case further processing must be done in refineries configured to handle either diluted or upgraded feedstocks.

Many heavy hydrocarbon feedstocks are also characterized as comprising significant amounts of BS&W (bottom sediment and water). Such feedstocks are not suitable for transportation by pipeline, or refining due to their corrosive properties and the presence of sand and water. Typically, feedstocks characterized as having less than 0.5 wt % BS&W are transportable by pipeline, and those comprising greater amounts of BS&W require some degree of processing or treatment to reduce the BS&W content prior to transport. Such processing may include storage to let the water and particulates settle, and heat treatment to drive off water and other components. However, these manipulations add to operating cost. There is therefore a need within the art for an efficient method of upgrading feedstock having a significant BS&W content prior to transport or further processing of the feedstock.

Heavy oils and bitumens can be upgraded using a range of processes including thermal (e.g. U.S. Pat. No. 4,490,234; U.S. Pat. No. 4,294,686; U.S. Pat. No. 4,161,442), hydrocracking (U.S. Pat. No. 4,252,634), visbreaking (U.S. Pat. No. 4,427,539; U.S. Pat. No. 4,569,753; U.S. Pat. No. 5,413,702), or catalytic cracking (U.S. Pat. No. 5,723,040; U.S. Pat. No. 5,662,868; U.S. Pat. No. 5,296,131; U.S. Pat. No. 4,985,136; U.S. Pat. No. 4,772,378; U.S. Pat. No. 4,668,378, U.S. Pat. No. 4,578,183) procedures. Several of these processes, such as visbreaking or catalytic cracking, utilize either inert or catalytic particulate contact materials within upflow or downflow reactors. Catalytic contact materials are for the most part zeolite based (see for example U.S. Pat. No. 5,723,040; U.S. Pat. No. 5,662,868; U.S. Pat. No. 5,296,131; U.S. Pat. No. 4,985,136; U.S. Pat. No. 4,772,378; U.S. Pat. No. 4,668,378, U.S. Pat. No. 4,578,183; U.S. Pat. No. 4,435,272; U.S. Pat. No. 4,263,128), while visbreaking typically utilizes inert contact material (e.g. U.S. Pat. No. 4,427,539; U.S. Pat. No. 4,569,753), carbonaceous solids (e.g. U.S. Pat. No. 5,413,702), or inert kaolin solids (e.g. U.S. Pat. No. 4,569,753).

The use of fluid catalytic cracking (FCC), or other units for the direct processing of bitumen feedstocks is known in the art. However, many compounds present within the crude feedstocks interfere with these processes by depositing on the contact material itself. These feedstock contaminants include metals such as vanadium and nickel, coke precursors such as (Conradson) carbon residues, and asphaltenes. Unless removed by combustion in a regenerator, deposits of these materials can result in poisoning and the need for premature replacement of the contact material. This is especially true for contact material employed with FCC processes, as efficient cracking and proper temperature control of the process requires contact materials comprising little or no combustible deposit materials or metals that interfere with the catalytic process.

To reduce contamination of the catalytic material within catalytic cracking units, pretreatment of the feedstock via visbreaking (U.S. Pat. No. 5,413,702; U.S. Pat. No. 4,569,753; U.S. Pat. No. 4,427,539), thermal (U.S. Pat. No. 4,252,634; U.S. Pat. No. 4,161,442) or other processes, typically using FCC-like reactors, operating at temperatures below that required for cracking the feedstock (e.g. U.S. Pat. No. 4,980,045; U.S. Pat. No. 4,818,373 and U.S. Pat. No. 4,263,128) have been suggested. These systems operate in series with FCC units and function as pre-treaters for FCC. These pretreatment processes are designed to remove contaminant materials from the feedstock, and operate under conditions that mitigate any cracking. These processes ensure that any upgrading and controlled cracking of the feedstock takes place within the FCC reactor under optimal conditions.

Bitumen feedstocks comprise solids such as, sand and other particulates. Direct processing of bitumen feedstocks must be carried out by contact of a hydrogen-containing gas with the hydrocarbon feed stream at elevated temperatures and pressures. Thus, the major costs of such processing are essentially in obtaining and maintaining of the processing equipment. Examples of the major costs are: vessels and associated furnaces, heat exchangers, distributor plate assemblies, pumps, piping and valves capable of such service and the replacement cost of catalyst contaminated in such service, and the cost of assembling the equipment. Commercial hydroprocessing of relatively low cost feed stocks such as reduced crude oils containing pollutant compounds, requires a flow rate on the order of a few thousand up to one hundred thousand barrels per day, with concurrent flow of hydrogen at up to 10,000 standard cubic feet per barrel of the liquid feed. Vessels capable of containing such a reaction process are accordingly cost-intensive both due to the need to contain and withstand corrosion and metal embrittlement by the hydrogen compounds, sulfur compounds and the solids within the bitumen feedstocks, while carrying out the desired reactions at elevated pressure and temperatures. Pumps, piping and valves for handling fluid streams containing hydrogen at such pressures and temperatures are also costly, because at such pressures seals must remain hydrogen impervious over extended service periods of many months. Fine and ultra-fine, clays, sands and particulates in the heavy oil and bitumen may reduce the effectiveness of the seals overtime, as well. It is also cost-intensive to insure that all of the equipment are assembled, manufactured and/or maintained correctly.

Even taking all the precautions taken during the upgrading process and with the assembly, manufacture and maintenance of the equipment to ensure the purest end product, one skilled in the art understand it is inevitable that the end product often comprises fine and ultra-fine clays, sands and particulates that are from the bitumen or petroleum feedstock.

SUMMARY

A method, system, and apparatus for separation in processing of feedstocks are disclosed. According to one embodiment, an apparatus comprises a tubular vessel having a square pipe entry and a vapor outlet, wherein the vapor outlet is positioned at the top of the tubular vessel, and wherein the square pipe entry is tangential to an inner diameter of the tubular vessel; a barrel positioned below the tubular vessel; and a double isolation knife valve positioned between the tubular vessel and the barrel, wherein a stream of gas and solids enters the tubular vessel through the square pipe entry, and wherein the gas and solids are separated by using centrifugal force, and wherein the gas exits the vapor outlet and the solids are collected in the barrel.

The systems, methods, features and advantages of the invention will be or will become apparent to one with skill in the art upon examination of the following figures and detailed description. It is intended that all such additional methods, features and advantages be included within this description, be within the scope of the invention, and be protected by the accompanying claims. It is also intended that the invention is not limited to require the details of the example embodiments.

BRIEF DESCRIPTION

The accompanying drawings, which are included as part of the present specification, illustrate the presently preferred embodiment and, together with the general description given above and the detailed description of the preferred embodiment given below, serve to explain and teach the principles of the present invention.

Figure 1:
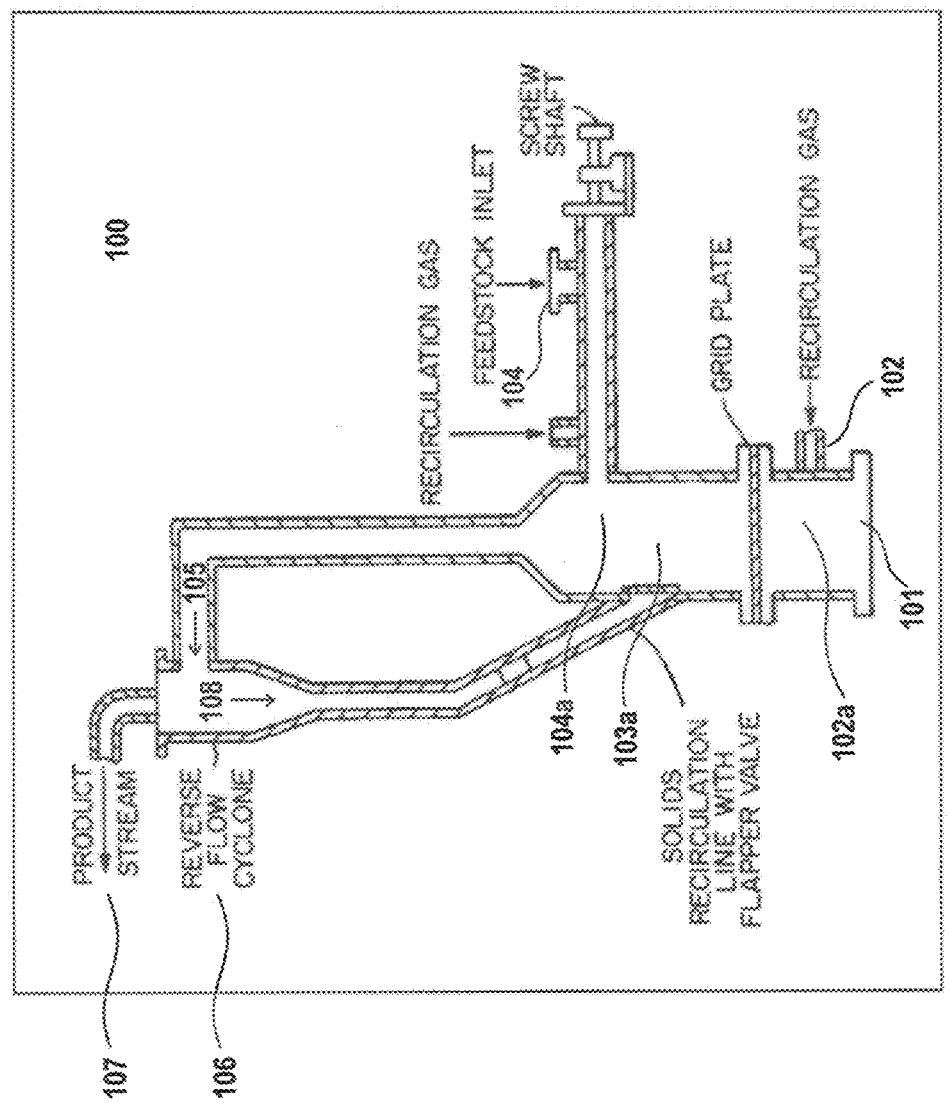
FIG. 1 illustrates a prior art reactor design.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not necessarily describe every aspect of the teachings disclosed herein and do not limit the scope of the claims.

DETAILED DESCRIPTION

A method, system, and apparatus for separation in processing of feedstocks are disclosed. According to one embodiment, an apparatus comprises a tubular vessel having a square pipe entry and a vapor outlet, wherein the vapor outlet is positioned at the top of the tubular vessel, and wherein the square pipe entry is tangential to an inner diameter of the tubular vessel; a barrel positioned below the tubular vessel; and a double isolation knife valve positioned between the tubular vessel and the barrel, wherein a stream of gas and solids enters the tubular vessel through the square pipe entry, and wherein the gas and solids are separated by using centrifugal force, and wherein the gas exits the vapor outlet and the solids are collected in the barrel.

The present disclosure provides an apparatus or an addition to rapid thermal processing assembly that is capable of producing an excellent, steady and smooth flow of a mixture of a gas, (e.g. a hydrogen-containing gas) and a liquid (e.g. a liquid hydrocarbon) into a reactor without deficiencies associated with the prior art methods and apparatuses.

The present system overcomes disadvantages of the prior art by providing a secondary separator downstream of the reactor to provide removal of the feedstock and reaction product solids from the reaction product vapor and an increase quality of reactor product. The purpose of the reactor is to convert a heavy oil feedstock into a lighter end product, via pyrolysis reaction (thermal cracking) inside a circulating bed, solid heat carrier transport reactor system.

The present disclosure provides for a secondary separator (also referred to herein interchangeably as an inertial separator and a secondary separation system) for rapid thermal processing for upgrading viscous heavy hydrocarbon feedstocks. The secondary separator includes a cylindrical member and a structure defining an opening at an upper end and an opening at a lower end and at least one opening with an axis running perpendicular to the cylindrical member through which a mix of product gas and particulates enter the secondary separator. At least one second cylindrical member that is internal to the first cylindrical member at upper most opening with an axis that runs normal to the cylindrical member. Attached to the cylindrical member is a domed structure at the opening of the lower end of the cylindrical member. The domed structure further reduces the size of the opening at the lower end of the first cylindrical member. The particulates exit the secondary separator through the opening at the lower end of the secondary separator. The present invention further accomplishes its desired objects by receiving a product gas from a reactor. The product gas contains particulates from the feedstock, reaction product, or circulating solid heat carrier carried from the reactor vessel which must be separated from the reaction product vapor. The product gas passes through the secondary separator reducing the amount of particulates and improving the quality of the reaction product vapor.

The present secondary separator is utilized in the processes for upgrading heavy oil or bitumen feedstock involving a partial chemical upgrade or mild cracking of the feedstock. These processes also reduce the levels of contaminants within feedstocks, thereby mitigating contamination of catalytic contact materials such as those used in cracking or hydrocracking, with components present in the heavy oil or bitumen feedstock. Such processes and/or methods and the related apparatuses and products are described in U.S. Pat. No. 7,572,365; U.S. Pat. No. 7,572,362; U.S. Pat. No. 7,270,743; U.S. Pat. No. 5,792,340; U.S. Pat. No. 5,961,786; U.S. Pat. No. 7,905,990; and pending U.S. patent application Ser. Nos. 13/340,487, 13/340,569, 12/046,363 and 09/958,261 incorporated herein by reference in their entirety.

As described in U.S. Pat. No. 5,792,340 (incorporated herein by reference in its entirety), for the present type of pyrolysis reactor system, a feed dispersion system is required for liquid feedstock. Transport gas (lift gas) is introduced to the reactor through a plenum chamber located below a gas distribution plate. The purpose of the feed dispersion system is to achieve a more efficient heat transfer condition for the liquid feedstock by reducing the droplet size of the liquid feed to increase the surface area to volume ratio. The purpose of the lift gas distribution plate (distributor plate) is to provide the optimum flow regime of gas that facilitates the mixing of feed and solid heat carrier.

By "feedstock" or "heavy hydrocarbon feedstock", it is generally meant a petroleum-derived oil of high density and viscosity often referred to (but not limited to) heavy crude, heavy oil, (oil sand) bitumen or a refinery resid (oil or asphalt). However, the term "feedstock" may also include the bottom fractions of petroleum crude oils, such as atmospheric tower bottoms or vacuum tower bottoms. Furthermore, the feedstock may comprise significant amounts of BS&W (Bottom Sediment and Water), for example, but not limited to, a BS&W content of greater than 0.5 wt %. Heavy oil and bitumen are preferred feedstocks. Embodiments of the invention can also be applied to the conversion of other feedstocks including, but not limited to, plastics, polymers, hydrocarbons, petroleum, coal, shale, refinery feedstocks, bitumens, light oils, tar mats, pulverized coal, biomass, biomass slurries, biomass liquids from any organic material and mix. Preferably, the biomass feedstock is a dry wood feedstock, which may be in the form of sawdust, but liquid and vapour-phase (gas-phase) biomass materials can be effectively processed in the rapid thermal conversion system using an alternative liquid or vapour-phase feed system. Biomass feedstock materials that may be used include, but are not limited to, hardwood, softwood, bark, agricultural and silvicultural residues, and other biomass carbonaceous feedstocks.

As described in U.S. Pat. No. 5,792,340, for the present type of pyrolysis reactor system, a feed dispersion system is required for liquid feedstock. Transport gas (lift gas) is introduced to the reactor through a plenum chamber located below a gas distribution plate. The purpose of the feed dispersion system is to achieve a more efficient heat transfer condition for the liquid feedstock by reducing the droplet size of the liquid feed to increase the surface area to volume ratio. The purpose of the lift gas distribution plate (distributor plate) is to provide the optimum flow regime of gas that facilitates the mixing of feed and solid heat carrier.

FIG. 1 illustrates a prior art reactor design. The reactor design 100 includes a tubular reactor 101 where recirculation or lift gas 102 enters at a lowest point 102a. Regenerated solid heat carrier 103 enters at a slightly higher point 103a, and reactor feed liquid 104 is introduced at a highest point 104a. Coked/spent solid heat carrier, products, and other gases and particulates 105 emanated from the top of the reactor enter a cyclone separator 106, where the gases (product vapor and other gases) and solids (solid heat carrier and particulates) separate. The product vapor and other gases continue on downstream of the process for further separation of products 107. The stream of solids 108 enters a reheater system 109 (reheater system 109 not depicted in figure but inclusion in system will be appreciated by one of ordinary skill in the art). The solid heat carrier gets regenerated, and then passes through a lateral section to transport the regenerated solid heat carrier 103 back to the reactor 101.

Figure 2:
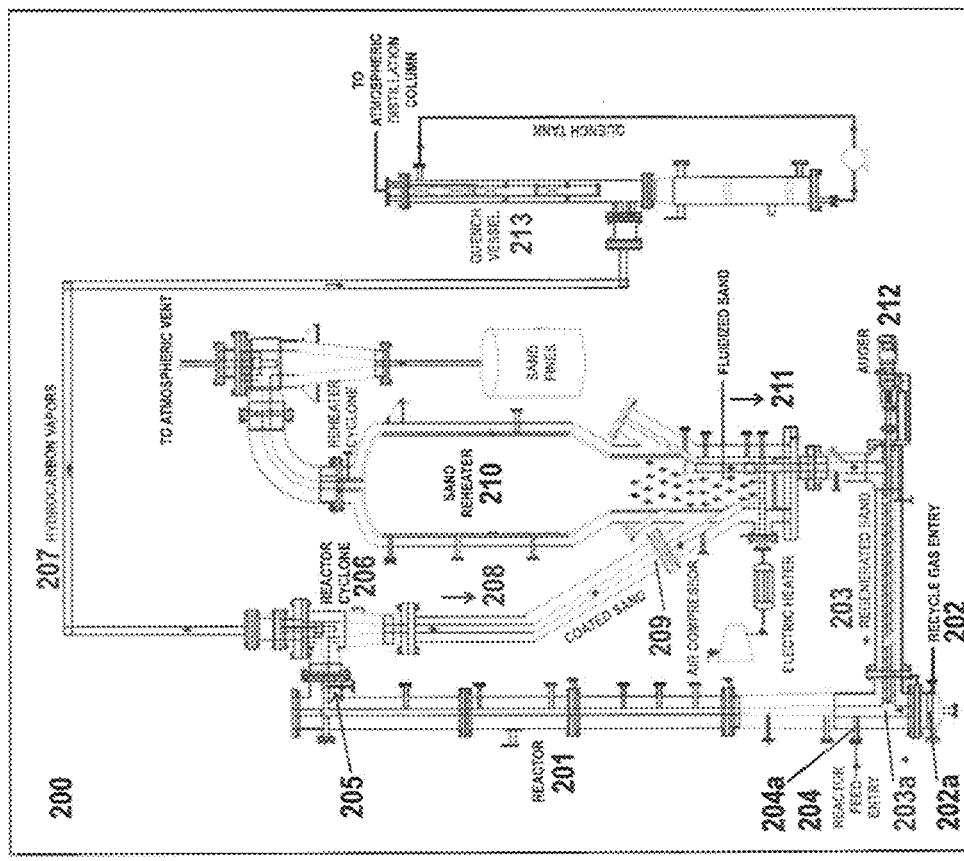
FIG. 2 illustrates a prior art reactor design.

FIG. 2 illustrates a prior art reactor design. Similar to the prior art hot section 100 depicted in FIG. 1, reactor design 200 includes a tubular reactor 201 where recirculation or lift gas 202 enters at a lowest point 202a. Regenerated solid heat carrier 203 enters the reactor 201 at a slightly higher point 203a. Reactor feed liquid 204 is introduced at a highest point 204a in relation to the entry points of the lift gas (202a) and solid heat carriers (203a). Coked/spent solid heat carrier, products, and other gases and particulates 205 emanated from the top of the reactor enter a cyclone separator 206, where the gases (product vapor and other gases) and solids (solid heat carrier and particulates) separate. The product vapor and other gases continue on downstream of the process for further separation of products 207. The solids re-enter the reactor system 208 (where the solid heat carrier gets regenerated) and then a lateral section to transport the regenerated solid heat carrier 203 back to the reactor. It will be appreciated by one of ordinary skill in the art that the specific methods for solid heat carrier regeneration and transport back to the reactor may have variations between embodiments without departing from the scope of the present disclosure.

The solid stream 208 leaves the bottom of the cyclone 206, and passes through a slanted section (dipleg) 209 and enters the regenerator section (sand reheater) 210. In the reheater 210, the solids are mixed with high temperature air, and the solid heat carrier is regenerated by combusting off the coke deposits. The solid heat carrier is also heated to a high temperature by the combustion. The hot, regenerated solid heat carrier exits 211 the bottom of the reheater, and is transported back to the reactor 201 via an auger 212.

The gaseous stream leaves the top of the cyclone 206 and travels 207 downstream to undergo further processing. This gaseous stream mainly consists of hydrocarbon vapors and gases, and other gases from pyrolysis reaction, purges, combustion, and atmosphere ($N_2$, $O_2$, $CO_2$, CO, NOx, $H_2$, $H_2S$, and $SO_2$ are detected). There is also a variable amount of entrained solids, with the quantity dependent on the separation efficiency of the cyclone separator 206.

The gaseous stream travels downstream into the quench vessel 213, where hydrocarbon liquid at a lower temperature of 250° C. is recirculated. The quench vessel 213 serves two purposes. The first is to cool down the hydrocarbon vapors to bring them back into liquid phase, in preparation for further downstream processing. The second purpose is to remove the solids (primarily sand) from hydrocarbon products in the gaseous stream. Due to the drop in temperature, the kinetic energy of the solid particles is lowered to the point where most drops to the bottom of the quench vessel, whilst the hydrocarbon liquid leaves the top of the quench vessel.

While such configuration is effective in keeping most solid contaminants from the liquid products downstream of the quench vessel, a fair amount of liquid products that remain in the quench vessel 213 are rendered unusable in the final product blend due to a high concentration of solid contaminants. This is because in the prior art hot section design, any solids that are not separated from the gaseous stream by the cyclone separator 206 are eventually collected in the quench vessel 213. To put into perspective, the prior art hot section re-circulates sand at approximately 2000 lb/hr, and the cyclone separator used is rated with a separation efficiency of at least 99%. Thus, up to 1% (or 20 lb/hr) of solids can enter the quench vessel anytime sand circulation occurs. This is a substantial amount, considering that the rate of heavy oil feedstock entering the reactor during a run is usually no more than 60 lb/hr.

Figure 3:
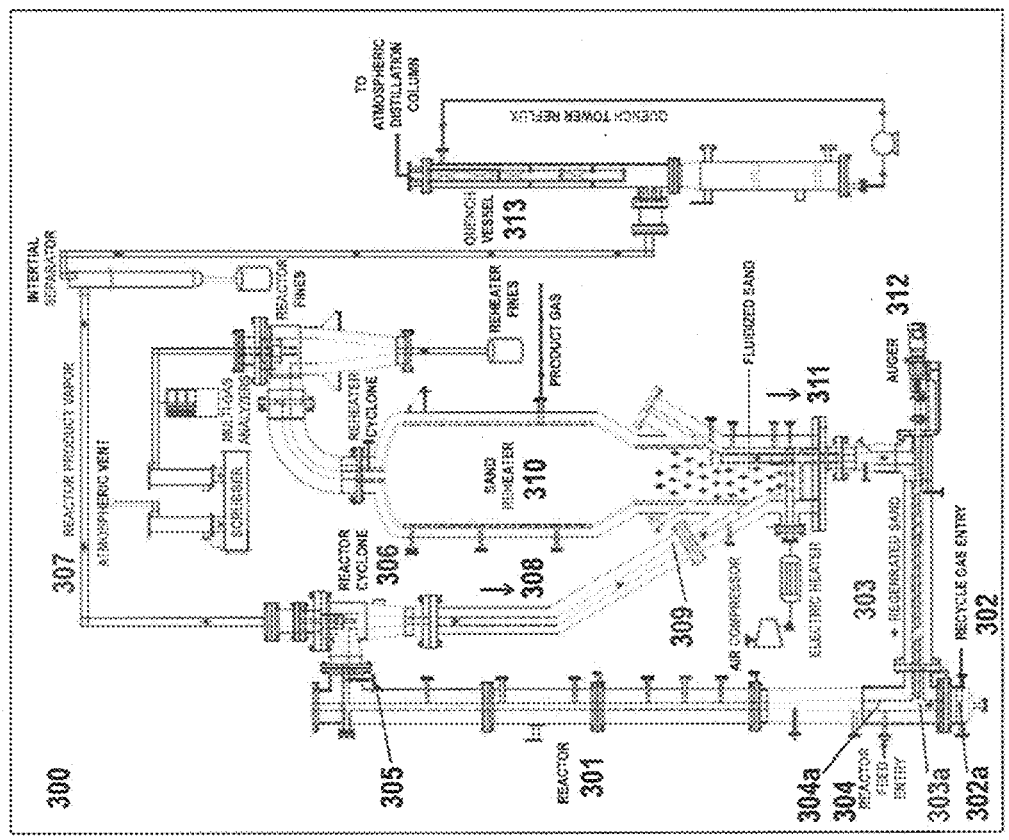
FIG. 3 illustrates an exemplary reactor design for use with the present system, according to one embodiment.

FIG. 3 illustrates an exemplary reactor design for use with the present system, according to one embodiment. Reactor design 300 includes a tubular reactor 301 where recirculation or lift gas 302 enters at a lowest point 302a. Regenerated solid heat carrier 303 enters the reactor 301 at a slightly higher point 303a. Reactor feed liquid 304 is introduced at a highest point 304a in relation to the entry points of the lift gas (302a) and solid heat carriers (303a). Coked/spent solid heat carrier, products, and other gases and particulates 305 emanated from the top of the reactor enter a cyclone separator 306, where the gases (product vapor and other gases) and solids (solid heat carrier and particulates) separate. The product vapor and other gases continue on downstream of the process for further separation of products 307. The solids re-enter the reactor system 308 (where the solid heat carrier gets regenerated) and then a lateral section to transport the regenerated solid heat carrier 303 back to the reactor. It will be appreciated by one of ordinary skill in the art that the specific methods for solid heat carrier regeneration and transport back to the reactor may have variations between embodiments without departing from the scope of the present disclosure.

The solid stream 308 leaves the bottom of the cyclone 306, and passes through a slanted section (dipleg) 309 and enters the regenerator section (sand reheater) 310. In the reheater 310, the solids are mixed with high temperature air, and the solid heat carrier is regenerated by combusting off the coke deposits. The solid heat carrier is also heated to a high temperature by the combustion. The hot, regenerated solid heat carrier exits 311 the bottom of the reheater, and is transported back to the reactor 301 via an auger 312.

The gaseous stream leaves the top of the cyclone 306 and travels 307 downstream to undergo further processing. This gaseous stream mainly consists of hydrocarbon vapors and gases, and other gases from pyrolysis reaction, purges, combustion, and atmosphere ($N_2$, $O_2$, $CO_2$, $CO$, $NOx$, $H_2$, $H_2S$, and $SO_2$ are detected). There is also a variable amount of entrained solids, with the quantity dependent on the separation efficiency of the cyclone separator 306.

To remedy the indicated deficiencies in the prior art, a secondary separator 400 is installed downstream of the cyclone separator 306, and upstream of the quench vessel 313. The gaseous stream travels downstream into the quench vessel 313, where hydrocarbon liquid at a lower temperature of 250° C. is recirculated. The quench vessel 313 cools down the hydrocarbon vapors to bring them back into liquid phase, in preparation for further downstream processing. The quench vessel 313 also removes solids (primarily sand) from hydrocarbon products in the gaseous stream that were not removed by the secondary separator 400.

Figure 4:
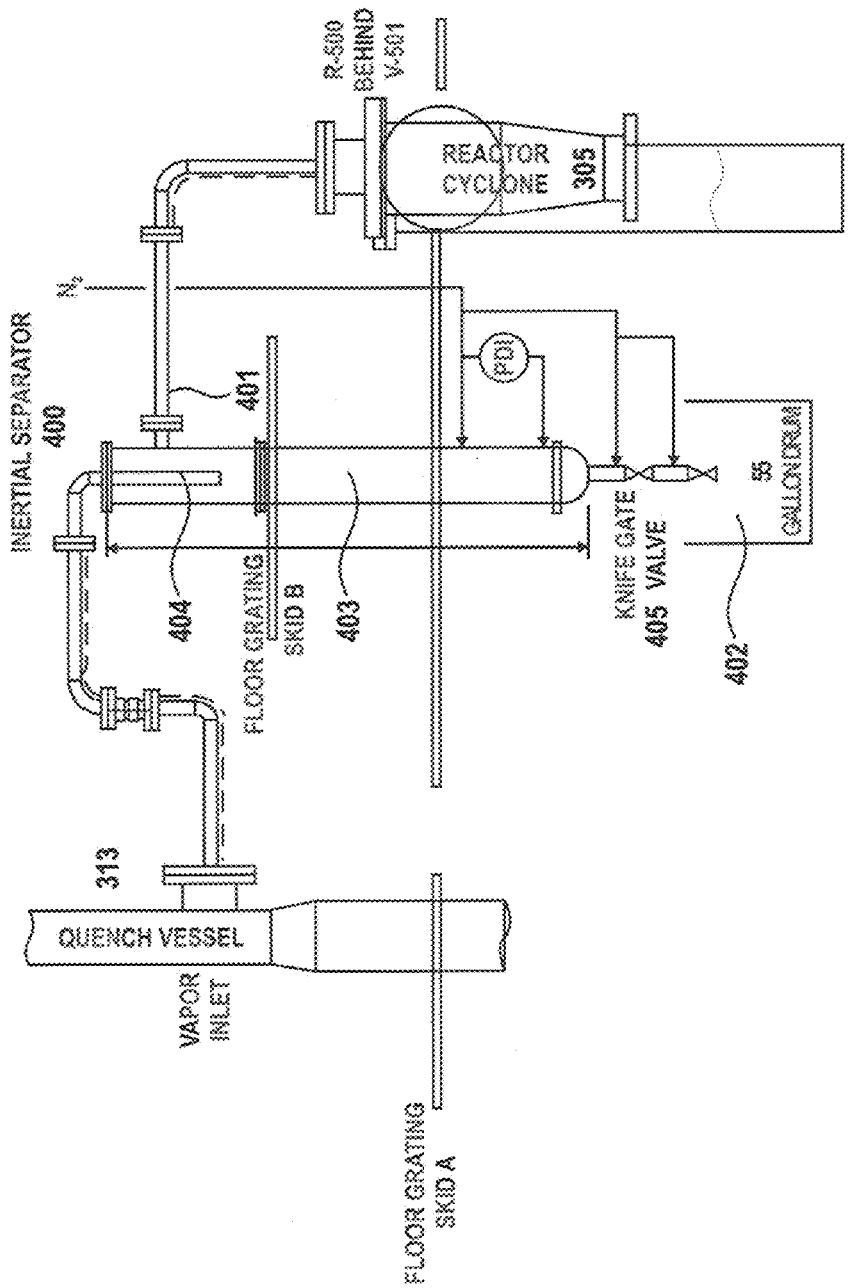
FIG. 4 illustrates an exemplary secondary separator section for use with the present reactor system, according to one embodiment.

FIG. 4 illustrates an exemplary secondary separator section for use with the present reactor system, according to one embodiment. The gaseous stream exits the cyclone separator 306 and enters the secondary separator 400, where further separation of gas and solid occurs. The processed stream then proceeds on to the quench vessel 313.

According to one embodiment, the present secondary separator design utilizes facets of multiple gas/solids separation principles. The governing parameters are reducing capital/maintenance costs with maximum particulate matter (PM) removal efficiency. The secondary separator is self supportive, which means that the internal volume is designed to hold 200 lbs of sand and still function with minimal loss of separation efficiency. Also, the secondary separator is lined with high wattage heat cable, which provides adequate heat to the vessel walls to compensate for quenching on the vessel walls (with no refractory for insulation). Based on preliminary calculations, the particulate cut point ($d_{50}$) of the present separator is 15 microns (50% efficiency at $d_{50}$).

$$d_{pc} = \sqrt{\frac{9 \, \mu W}{2\pi N_e V_i (\rho_p - \rho_g)}}$$

Where:
$\mu$=gas viscosity (kg/m-sec)
W=width of inlet (m)
$N_e$=number of turns in cyclone
$V_i$=inlet velocity (m/sec)
$\rho_p$=particle density (kg/m$^3$)
$\rho_g$=gas density (kg/m$^3$).

The gaseous stream with entrained solids (approximately 0.07 lb solids/ft3 of gas) enters the secondary separator 400 through an exemplary 2.9 inch square pipe 401, which is located tangent to its internal diameter. The tangential entry through a square pipe 401 allows the gas/solids flow to enter into the separator 400 and begin a downward spiral. As the gas continues its downward spiral, the solids are kept in the outer vortex due to centrifugal force and inertia. As the solids hit the vessel inner diameter, they separate after N revolutions and are drawn toward the bottom bowl 402 of the secondary separator 400. After approximately 4-5 revolutions, the gas travels through the center of a 10 inch pipe 403 and out of a 3 inch vapor outlet 404.

Figure 5:
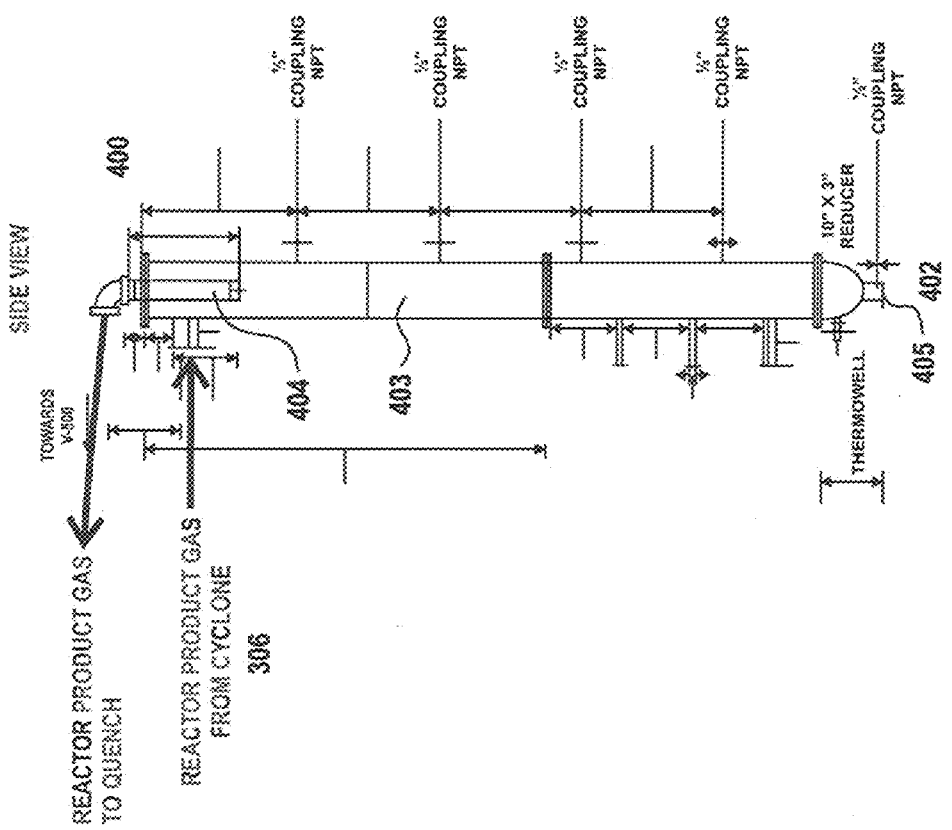
FIG. 5 illustrates a detail design drawing of an exemplary secondary separator for use with the present system, according to one embodiment.

FIG. 5 illustrates a detail design drawing of an exemplary secondary separator for use with the present system, according to one embodiment. The secondary separator 400 does not contain a conical section because the extended barrel length would provide sufficient internal revolutions and thus adequate solids separation. In addition, the secondary separator 400 is primarily a closed vessel. This means that technically there is no regular solids exit during operation. The method by which solids are removed from the separator 400 is via a double isolation knife valve (KV) 405 lock system, in which solids are unloaded manually in increments (e.g. 10 lb. increments). However, during a typical run session, the secondary separator 400 is deemed a closed vessel, thus the solids remain in the bottom of a barrel 402 throughout the run duration.

Due to its self-supportive design, the secondary separator 400 essentially takes over the role of the quench vessel 313 as a solids collector downstream of the cyclone separator 306. Table 1 and Table 2 show the total amount of sandy solids drained from the quench vessel during runs without and with the secondary separator 400. Table 1 and Table 2 also show the duration of sand circulation and the sand circulation rate, both of which are used to calculate the actual cyclone separation efficiency for each run.

$$M_{total\ sand} = m_{sand} \times t_{circulation}$$

$$\eta_{cyclone} = 100\% \times (M_{V800\ sand} \div M_{total\ sand})$$

where:
$M_{V800\ sand}$=Sand from quench vessel, lb
$M_{total\ sand}$=Cyclone total sand throughput, lb
$m_{sand}$=Sand circulation rate, lb/hr
$t_{circulation}$=Sand circulation duration, hr
$\eta_{cyclone}$=Cyclone separation efficiency, wt %.

TABLE 1

Sand drained before secondary separator implementation.

| Run ID | Sand from secondary separator (lb) | Sand from quench vessel (lb) | Sand circulation duration (hr) | Sand circulation rate (lb/hr) | Cyclone total sand throughput (lb) | Cyclone separation efficiency (wt %) |
|---|---|---|---|---|---|---|
| A014 | na | 93.5 | 17.6 | 2424 | 42662 | 99.8 |
| A015 | na | 104 | 28.3 | 2421 | 68514 | 99.8 |
| A016 | na | 166 | 28.3 | 2476 | 70071 | 99.8 |
| A017 | na | 84.9 | 24.1 | 2435 | 58684 | 99.9 |
| A018 | na | 67.1 | 21.2 | 2441 | 51749 | 99.9 |
| A019 | na | 103 | 16.6 | 2477 | 41118 | 99.7 |
| A020 | na | 285 | 26.0 | 2425 | 63050 | 99.5 |
| A021 | na | 189 | 8.80 | 2436 | 21437 | 99.1 |
| A022 | na | 128 | 34.9 | 2291 | 79956 | 99.8 |
| A023 | na | 174 | 33.5 | 2024 | 67804 | 99.7 |
| A024 | na | 131 | 40.8 | 2231 | 91025 | 99.9 |
| A025 | na | 129 | 36.9 | 2227 | 82176 | 99.8 |
| A026 | na | 177 | 19.9 | 2254 | 44855 | 99.6 |
| A027 | na | 179 | 25.3 | 2260 | 57178 | 99.7 |
| Average | na | 144 | 25.9 | 2344 | 60020 | 99.7 |

TABLE 2

Sand drained after secondary separator implementation.

| Run ID | Sand from secondary separator (lb) | Sand from quench vessel (lb) | Sand circulation duration (hr) | Sand circulation rate (lb/hr) | Cyclone total sand throughput (lb) | Cyclone separation efficiency (wt %) |
|---|---|---|---|---|---|---|
| A028 | 94.9 | 0.00 | 21.8 | 2234 | 48701 | 99.8 |
| A029 | 138 | 0.00 | 21.7 | 2362 | 51255 | 99.7 |
| B030 | 237 | 0.00 | 30.7 | 2197 | 67448 | 99.6 |
| B031 | 258 | 0.00 | 32.7 | 2246 | 73444 | 99.6 |
| A032 | 147 | 0.00 | 21.1 | 2298 | 48488 | 99.7 |
| A033 | 131 | 0.00 | 28.4 | 2185 | 62054 | 99.8 |
| A034 | 89.0 | 0.00 | 28.3 | 2256 | 63845 | 99.9 |
| M035 | na | 0.00 | 22.8 | 2277 | 51916 | na |
| M036 | na | 0.00 | 31.8 | 2166 | 68879 | na |
| M037 | 99.0 | 0.00 | 34.1 | 2287 | 77987 | 99.9 |
| M038 | 206 | 0.00 | 32.3 | 2203 | 71157 | 99.7 |
| M039 | 154 | 0.00 | 31.7 | 2230 | 70691 | 99.8 |
| B040 | 123 | 0.00 | 27.1 | 2249 | 60948 | 99.8 |
| A041 | 178 | 0.00 | 40.5 | 2275 | 92138 | 99.8 |
| E042 | 107 | 0.00 | 31.2 | 2195 | 68484 | 99.8 |
| E043 | 100 | 0.00 | 22.4 | 2100 | 47040 | 99.8 |
| E044 | 41.5 | 0.00 | 25.3 | 2250 | 56925 | 99.9 |
| E045 | 71.5 | 0.00 | 29.6 | 2385 | 70596 | 99.9 |
| Average | 136 | 0.00 | 28.5 | 2244 | 64000 | 99.8 |

Figure 6:
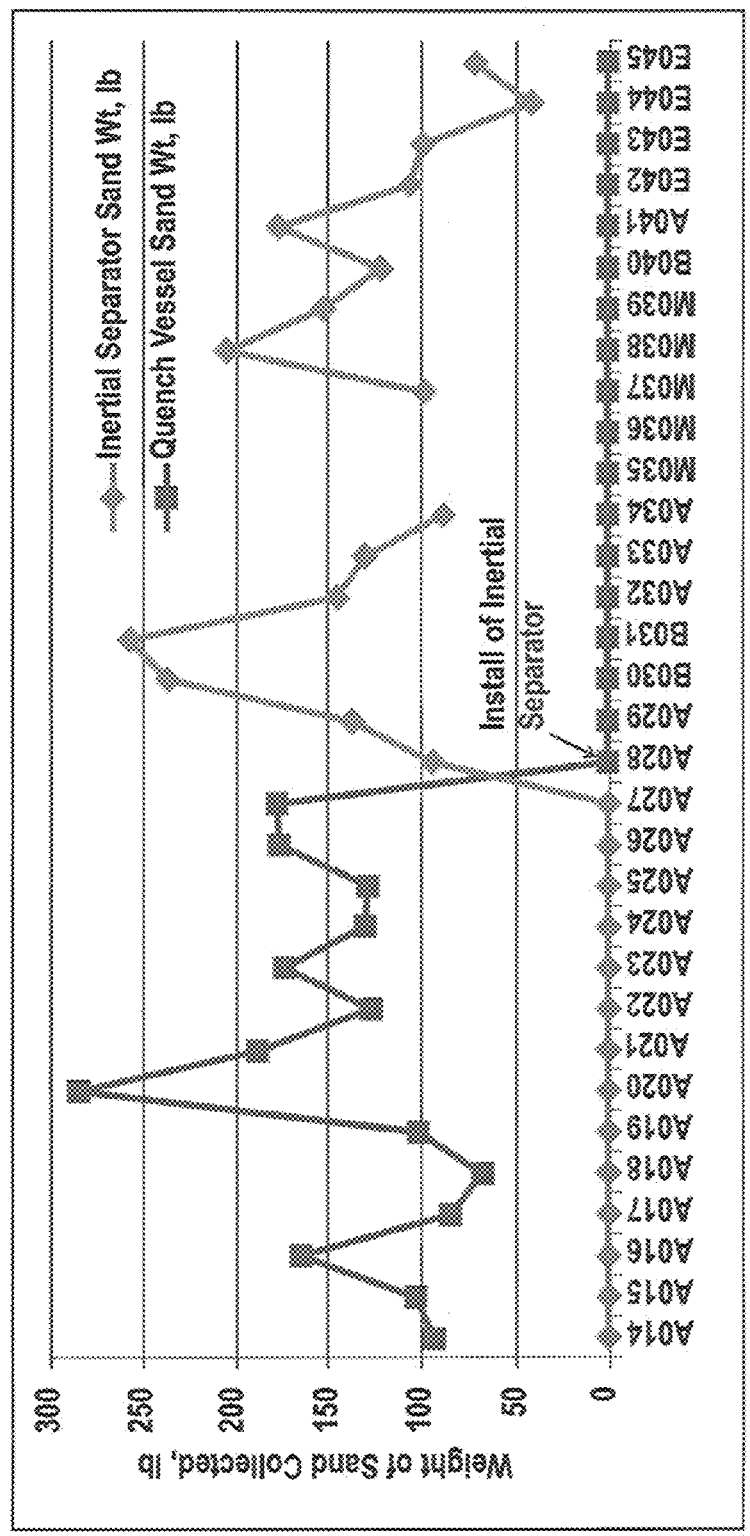
FIG. 6 illustrates a comparison of solid weight collection trends by the present secondary separator and the quench vessel, according to one embodiment.

FIG. 6 illustrates a comparison of solid weight collection trends by the present secondary separator and the quench vessel, according to one embodiment. On average, runs without the secondary separator collected 144 lb of solids in the quench vessel, and runs with the secondary separator collected no solids in the quench vessel. On the other hand, runs with the secondary separator collected 136 lb of solids in the secondary separator on average. Due to the close proximity of both averages (less than 6% of difference), it can be said that the secondary separator has intercepted almost all solids that would have ended up in the quench vessel. This is further confirmed by the close proximity between the cyclone separation efficiencies before and after the implementation of the secondary separator.

By reducing the majority of sand accumulation in the quench vessel, more of the quench vessel bottom's product can be used in the final synthetic crude oil (SCO) blend without the risk of solid contamination in the final product. It also improves efficiency of the operations personnel, by reducing the amount of times that the strainers of the quench vessel recirculation pump need to be cleaned, and also reducing the necessity to periodically drain the bottom of the quench vessel that had accumulated circulating solid heat carrier.

Such practical benefit to the operations personnel is especially crucial for hot sections having a new solid heat carrier transportation system between the reactor and reheater (referred to as the revamp).

TABLE 3

Sand drained from secondary separator and quench vessel (post-revamp).

| Run ID | Sand from secondary separator (lb) | Sand from quench vessel (lb) |
|---|---|---|
| E046 | 334 | 0.00 |
| E047 | 546 | 0.00 |
| E048 | 415 | 0.00 |
| B049 | 830 | 0.00 |
| A050 | 273 | 0.00 |
| A051 | 461 | 0.00 |
| A052 | 537 | 0.00 |
| A053 | 944 | 0.00 |
| A054 | 192 | 0.00 |
| A055 | 184 | 0.00 |
| A056 | 230 | 0.00 |
| A057 | 567 | 0.00 |
| Average | 459 | 0.00 |

Figure 7:
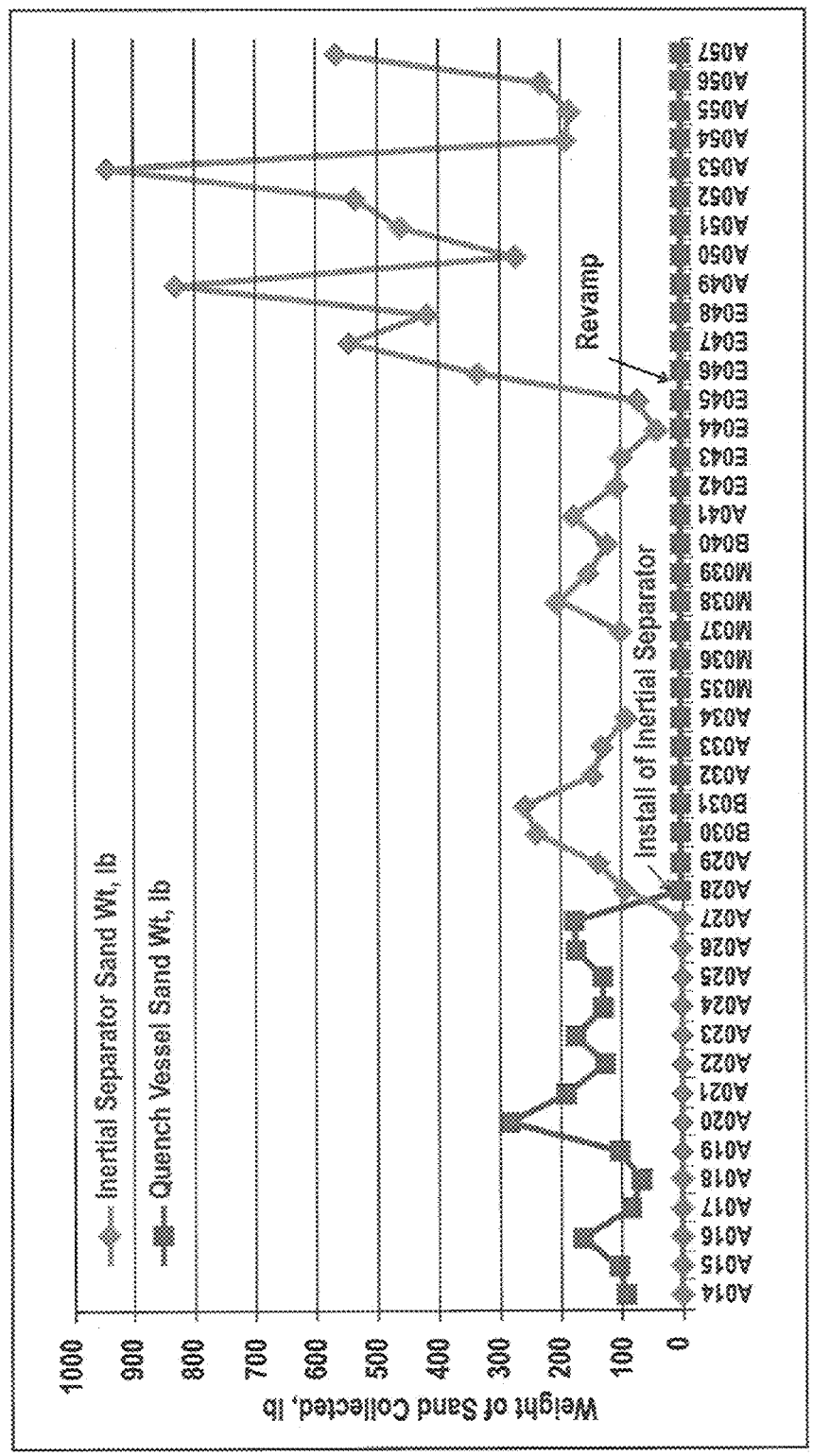
FIG. 7 illustrates exemplary trends of sand-carryover, according to one embodiment.

As illustrated by Table 3, the average amount of sand drained from the secondary separator during post-revamp runs is 459 lb. FIG. 7 illustrates sand-carryover from the cyclone separator to the secondary separator including events during training, testing of new equipment and operating regimes with new control systems.

The secondary separator was efficient and effective in collection of solids through a wide range of operating conditions and regimes.

Figure 8:
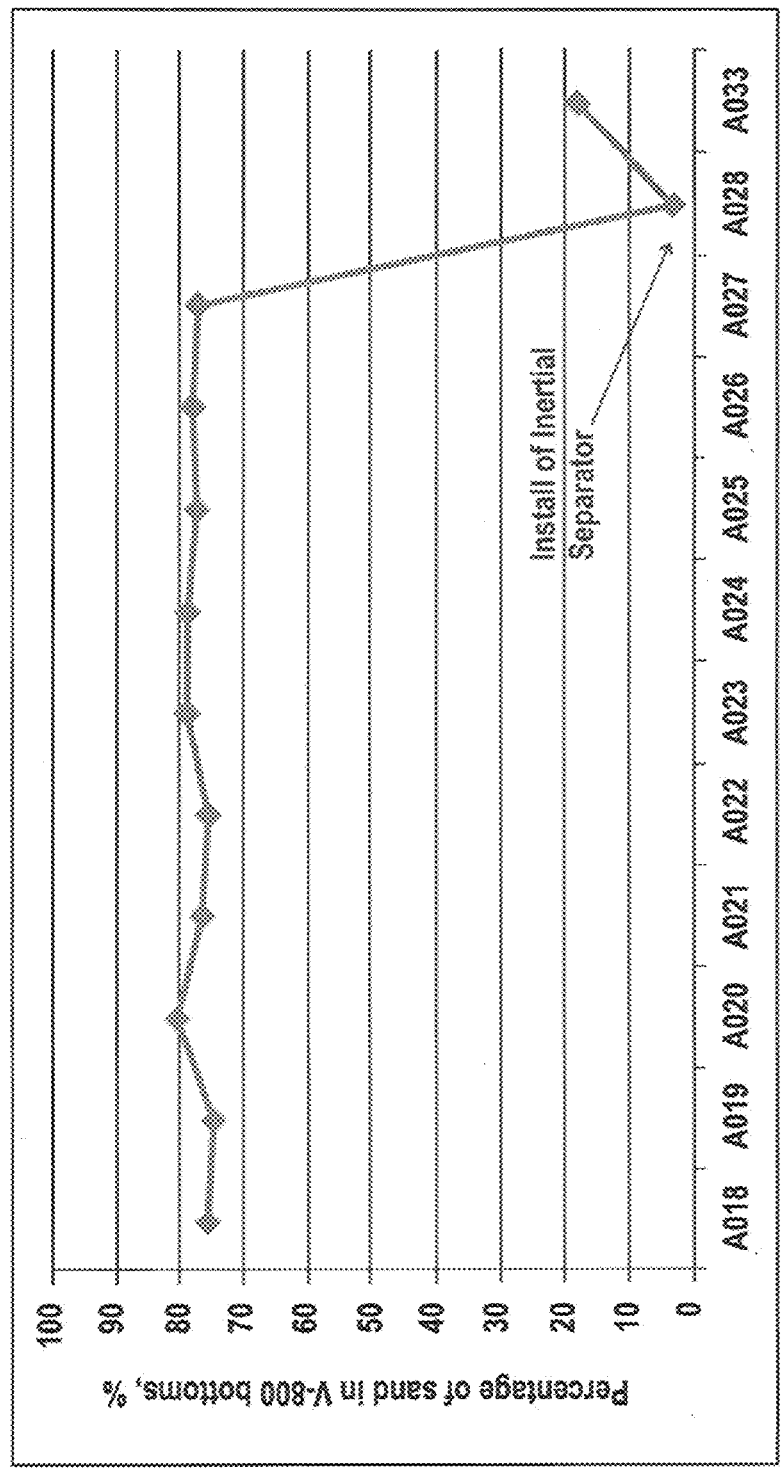
FIG. 8 illustrates exemplary results of hydrocarbon burn-off tests.

The weights of sand drained from the quench vessel shown in Table 1 are based on the gross weight of sand/oil mixture drained from the bottom of the quench vessel, and laboratory analysis of oil content of the mixture. The laboratory analysis method to determine the weight-based oil content of the sand/oil mixture is to burn off any combustible material (mostly oil) from the mixture, leaving behind sand. The analysis (hydrocarbon burn-off test) results are shown in Table 4 and illustrated in FIG. 8.

TABLE 4

Percentage of sand in quench vessel liquid.

| Sample ID | % Burnoff | % Sand |
|---|---|---|
| Before Secondary Separator Implementation | | |
| A018-V800 Bottoms-976 | 24.19 | 75.81 |
| A019-V800 Oil/Sand-1029 | 25.30 | 74.70 |
| A020-V800 Sand Bottoms-1130 | 19.62 | 80.38 |
| A021-V800 Oil/Sand-1144 | 23.59 | 76.41 |
| A022B-V800 Oil/Sand-1234 | 24.48 | 75.52 |
| A023-V800 Bottoms-1285 | 21.08 | 78.92 |
| A024-SP-V800 Bottoms-1362 | 21.20 | 78.80 |
| A025-V800 Bottoms-1458 | 22.57 | 77.43 |
| A026-V800 Oil/Sand-1519 | 21.96 | 78.04 |
| A027-V800 Bottoms-1569 | 22.91 | 77.09 |
| Average | 22.69 | 77.31 |
| After Secondary Separator Implementation | | |
| A028-V800 Bottoms-1616 | 97.01 | 2.99 |
| A033-B800 Bottoms-2046 | 82.16 | 17.84 |
| Average | 89.59 | 10.42 |

As illustrated in Table 4, there is an average of 77.31% of sand in the quench vessel liquid collected prior to the secondary separator implementation. After the implementation of the secondary separator, the average amount drops to 10.42%. This is an indication that the secondary separator collects the majority of solids that exist in the gaseous stream exiting the cyclone separator, and this is evident from the trends illustrated in FIG. 6.

A sufficient liquid level in the quench vessel is required during a run for circulation of quench liquid from the bottom of the tower to the top of the tower, and for this purpose, whole crude oil that is processed for a given run is charged into the quench vessel. A variety of factors influence the decrease of quench vessel liquid level, and charge liquid must be replenished to maintain the optimum liquid level. Such factors include changes in system pressures, flow rates, and frequency of quench vessel drains. By reducing the amount of sand accumulation in the quench vessel, the amount of charge liquid needed to maintain a liquid level in the quench vessel is also reduced.

To compare the relative quench vessel charge amounts between different runs, each quench vessel charge amount is paired with the total amount of reactor feed used for that particular run, because the reactor feed usage directly indicates the amount of heavy oil feedstock processed by the reactor system for a given run. The quench vessel charge to reactor feed ratios shown in Table 5 give the amount of quench vessel charge needed per unit of feedstock processed.

TABLE 5

Quench vessel charge to reactor feed ratio.

| Run ID | Quench Vessel Charge Weight, lb | Total Amount of Reactor Feed, lb | Quench Vessel Charge to Reactor Feed Ratio |
|---|---|---|---|
| Before Secondary Separator Implementation | | | |
| A019 | 149 | 449 | 0.332 |
| A020 | 237 | 276 | 0.859 |
| A021 | 235 | 61.0 | 3.85 |
| A022 | 463 | 475 | 0.975 |
| A023 | 361 | 331 | 1.09 |

TABLE 5-continued

Quench vessel charge to reactor feed ratio.

| Run ID | Quench Vessel Charge Weight, lb | Total Amount of Reactor Feed, lb | Quench Vessel Charge to Reactor Feed Ratio |
|---|---|---|---|
| A024 | 611 | 442 | 1.38 |
| A025 | 266 | 1050 | 0.253 |
| A026 | 412 | 183 | 2.25 |
| A027 | 257 | 304 | 0.845 |
| Average | 332 | 397 | 1.31 |
| After Secondary Separator Implementation | | | |
| A028 | 228 | 411 | 0.555 |
| A029 | 180 | 312 | 0.577 |
| B030 | 242 | 424 | 0.571 |
| B031 | 263 | 719 | 0.366 |
| A032 | 229 | 174 | 1.32 |
| A033 | 221 | 346 | 0.639 |
| A034 | 252 | 199 | 1.27 |
| M035 | 159 | 211 | 0.754 |
| M036 | 241 | 183 | 1.32 |
| M037 | 301 | 196 | 1.54 |
| M038 | 207 | 535 | 0.387 |
| M039 | 228 | 890 | 0.256 |
| B040 | 148 | 1007 | 0.147 |
| A041 | 172 | 1257 | 0.137 |
| E042 | 298 | 255 | 1.17 |
| E043 | 236 | 370 | 0.638 |
| E044 | 182 | 147 | 1.24 |
| E045 | 260 | 614 | 0.423 |
| Average | 225 | 458 | 0.739 |

As illustrated by Table 5, the amount of quench vessel charge needed without the secondary separator is almost twice as much as the amount needed with the secondary separator. The value of any heavy oil upgrade unit lies in the ability to convert heavier whole crude oil into lighter products. By introducing more whole crude oil directly to the quench vessel, bypassing any pre-processing and thermal cracking that occurs upstream of the quench vessel, no benefit is gained by the addition of the quench vessel charge. On the other hand, by reducing the amount of quench vessel charge liquid needed, less usage of whole crude oil is needed, and less spending is necessary in that regard.

The quench vessel functions as a "knock-out" vessel to keep any solids that enter the quench vessel from progressing further downstream keeping the liquid products clear from the solid feedstock contaminants. However, like any method of separation, it is not 100% efficient, and solid carryover from the quench vessel to downstream vessels is not completely avoidable, especially the finer, lighter particulates that are less likely to sink to the bottom of the quench vessel.

Due to the secondary separator, the quench vessel no longer has significant accumulation of solids since run A028 (see FIG. 7). With a significant decrease in the concentration of solids in the quench vessel, the amount of solids that could carryover to downstream vessels also decreases significantly. The vessels downstream of the quench vessel collect the majority of the liquid products that are eventually blended into the final product (Synthetic Crude Oil, or SCO). Therefore, the secondary separator is responsible for keeping a majority of solid feedstock contaminants out of the final product.

Figure 9:
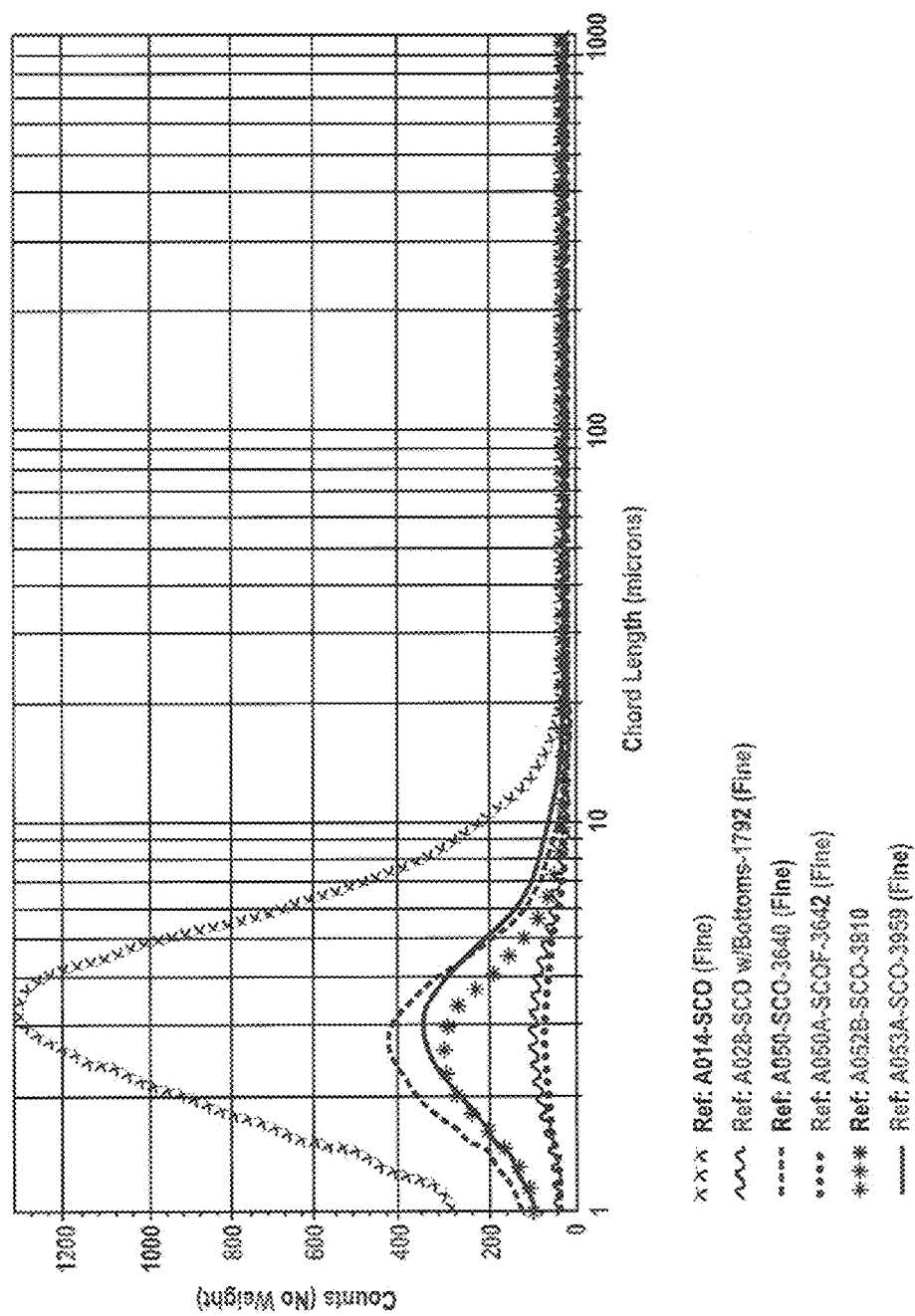
FIG. 9 illustrates exemplary particle count distributions of various synthetic crude oil products.

The synthetic crude oil final product can be analyzed for solid impurities, using a method called Focused Beam Reflectance Measurement (FBRM). The FBRM analysis results of various synthetic crude oil products are shown in Table 6, and the particle count distribution is shown in FIG. 9. The results for Run A014 synthetic crude oil, the run without the secondary separator, are compared to results for synthetic crude oil produced from runs with the secondary separator.

TABLE 6

FBRM analysis results for SCO samples.

| Trend | A014-SCO (without I.S.) | A028-SCO with Bottoms-1792 | A050-SCO-3640 | A050A-SCOF-3642 | A052B-SCO-3810 | A053A-SCO-3959 |
|---|---|---|---|---|---|---|
| Median No Wt, µm | 3.29 | 2.78 | 2.7 | 3 | 2.61 | 3 |
| Mean Sqr Wt, µm | 9.62 | 20.0 | 6.6 | 11.5 | 7.12 | 11.4 |
| counts No Wt <10, µm | 26200 | 1368. | 7380 | 1042 | 5004 | 6345 |
| counts No Wt 10-50, µm | 884 | 14.72 | 72.08 | 37.7 | 30.87 | 195 |
| counts No Wt 50-150, µm | 1.77 | 0.550 | 0.0700 | 0.120 | 0.140 | 0.760 |
| counts No Wt 150-300, µm | 0.00350 | 0.00370 | 0 | 0 | 0 | 0 |
| counts No Wt 300-1000, µm | 0.00 | 0.00 | 0 | 0 | 0 | 0 |
| Total counts, µm | 27000 | 1380 | 7450 | 1080 | 5030 | 6540 |

According to figures shown in Table 6, it is clear that the degree of solid contamination is less substantial for runs that utilized the secondary separator. While the A014 synthetic crude oil contains a total count of 27,000, the highest result out of all the runs with secondary separator is 7450 which is about 70% less than the A014 amount. Significant reductions of particulates of all sizes are also observed, especially those particulates less than 50 microns in size.

Figure 10:
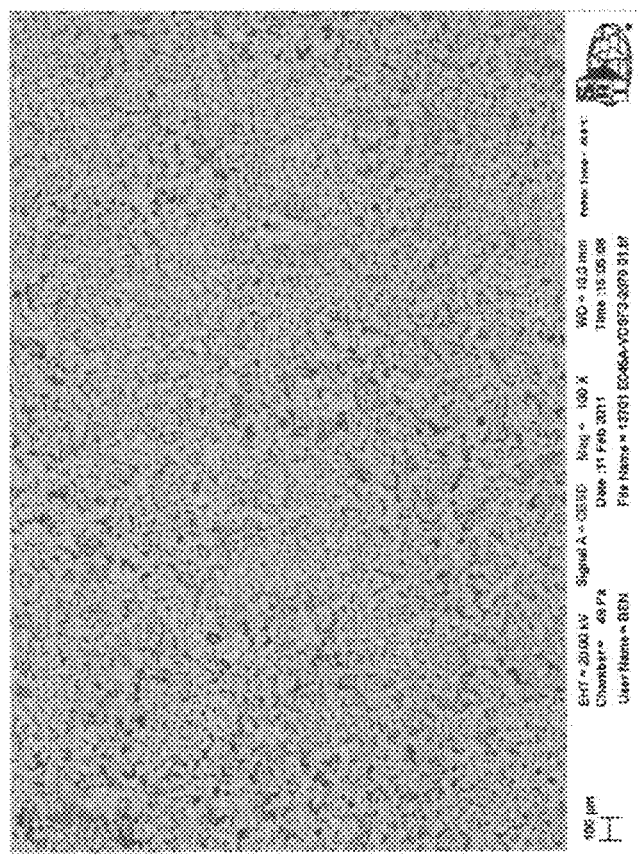
FIG. 10 illustrates a scanning electron microscope (SEM) image (100× magnification) of particulates captured by the present secondary separator, according to one embodiment.
Figure 11:
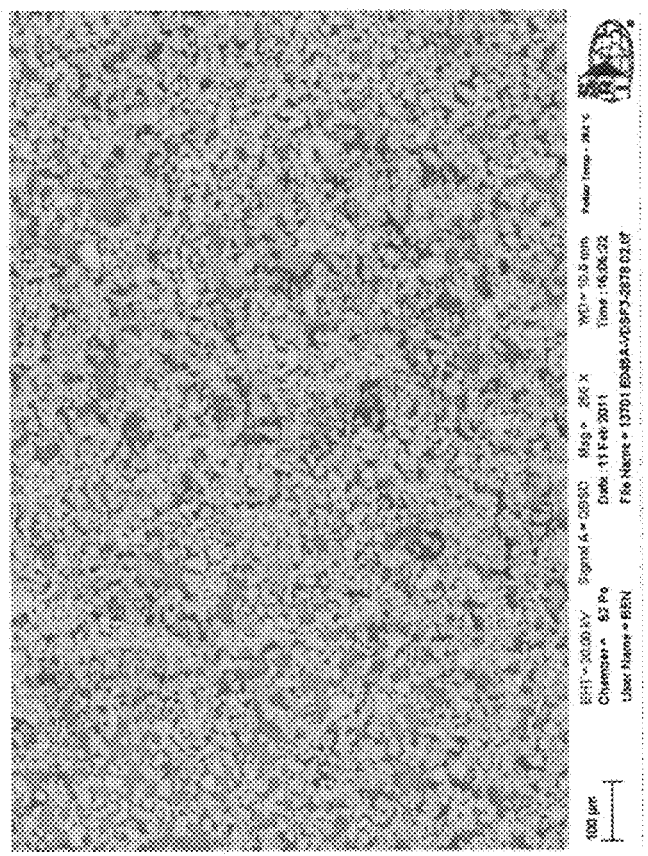
FIG. 11 illustrates a scanning electron microscope (SEM) image (500× magnification) of particulates captured by the present secondary separator, according to one embodiment.
Figure 12:
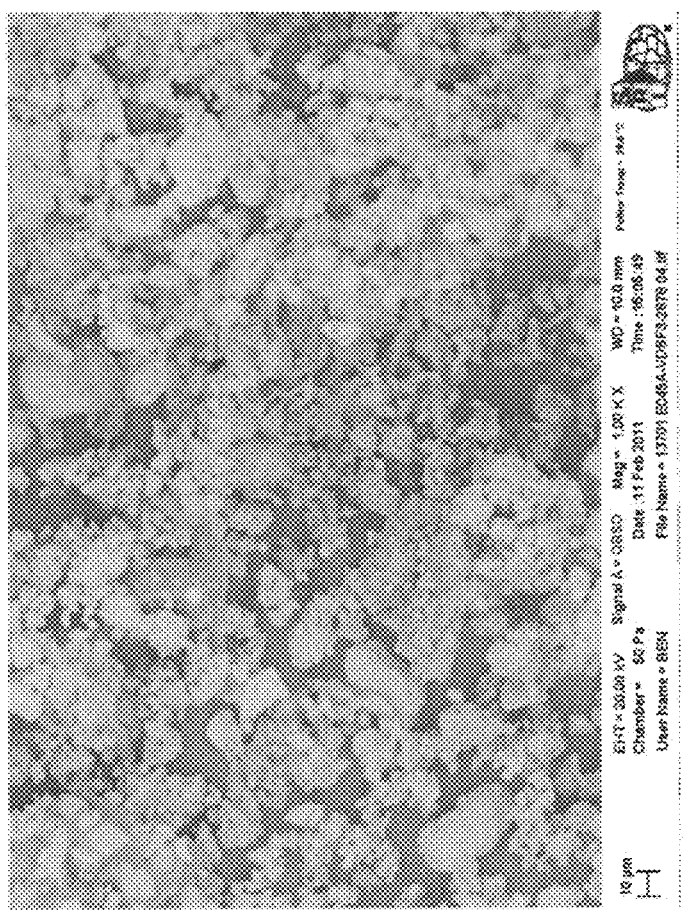
FIG. 12 illustrates a scanning electron microscope (SEM) image (1000× magnification) of particulates captured by the present secondary separator, according to one embodiment.

FIG. 10 illustrates a scanning electron microscope (SEM) image (100× magnification) of particulates captured by the present secondary separator, according to one embodiment. FIG. 11 illustrates a scanning electron microscope (SEM) image (500× magnification) of particulates captured by the present secondary separator, according to one embodiment. FIG. 12 illustrates a scanning electron microscope (SEM) image (1000× magnification) of particulates captured by the present secondary separator, according to one embodiment. Before the implementation of the secondary separator, these particulates would have remained in the vapor and ultimately contained in the final liquid product.

While both the cyclone separator 306 and the secondary separator 400 are in the same classification of separation devices, there are differences in the separation efficiencies of different particle sizes, due to technical design differences as depicted herein.

To compare the quality of separation between the cyclone separator 306 and the secondary separator 400, it is necessary the compare the solid output of both separators. A representative sample of a cyclone separator output is a solid (sand) sample taken in either the sample port located between the cyclone separator and the reheater, or a sample taken from the reheater. A representative sample of a secondary separator output is any solid drained from the bottom bowl of the separator, due to the lack of an exit for the solids.

A reasonable indication of the quality of separation is to determine the sizes of particles captured by the separator. Table 7 compares the particle size distribution of solids captured by the cyclone separator 306 and the secondary separator 400. These figures are based on samples taken from Run A028.

TABLE 7

Particle sizes of solids captured.

| Sample ID | Sand from Cyclone Separator A028-Sand Final-1637 | Sand from Secondary Separator A028-SandCatBtm3-1640 |
|---|---|---|
| <10 µm | 0.00 | 0.970 |
| 10 to 50 µm | 0.00 | 3.10 |
| 50 to 150 µm | 0.00 | 6.06 |
| 150 to 300 µm | 16.3 | 63.1 |
| 300 to 1000 µm | 83.7 | 26.8 |
| 1000+ µm | 0.00 | 0.00 |

Figure 13:
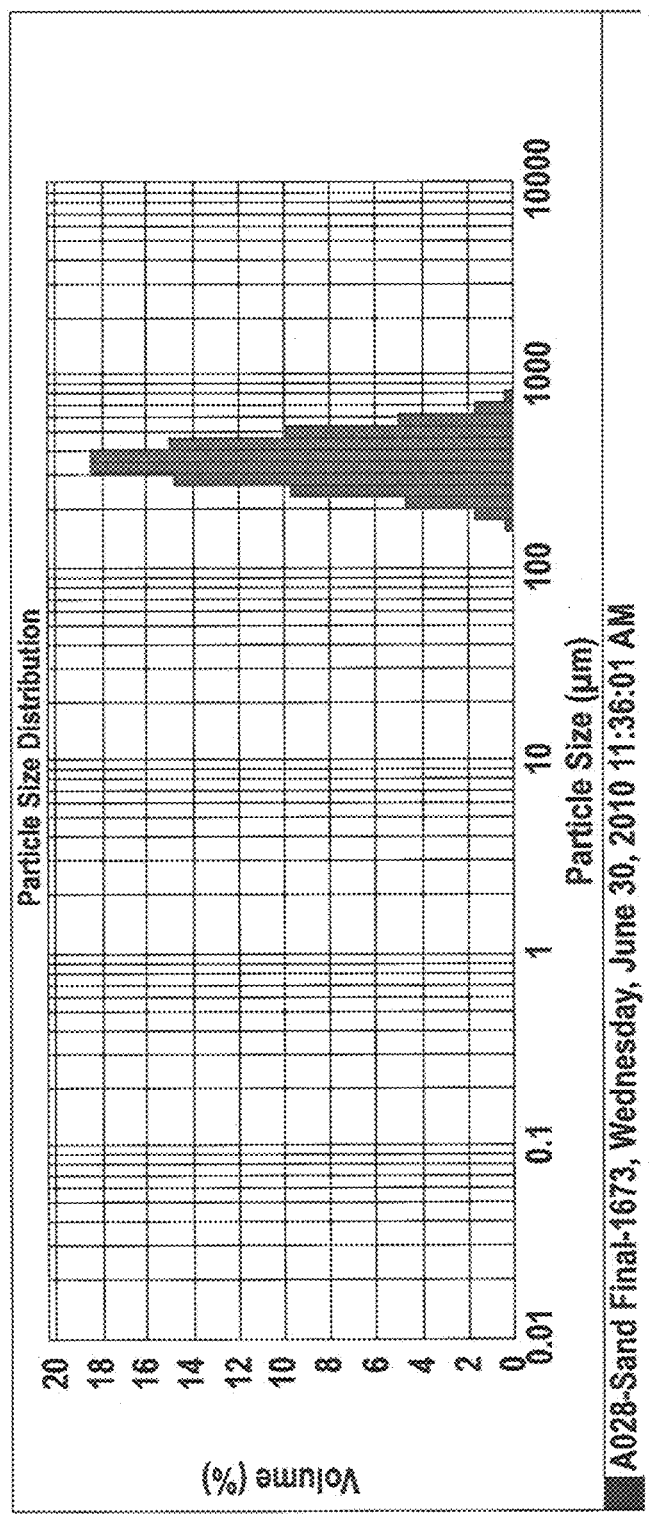
FIG. 13 and FIG. 14 illustrate histograms of particle size distribution of solids captured by a cyclone separator and the present secondary separator, according to one embodiment.
Figure 14:
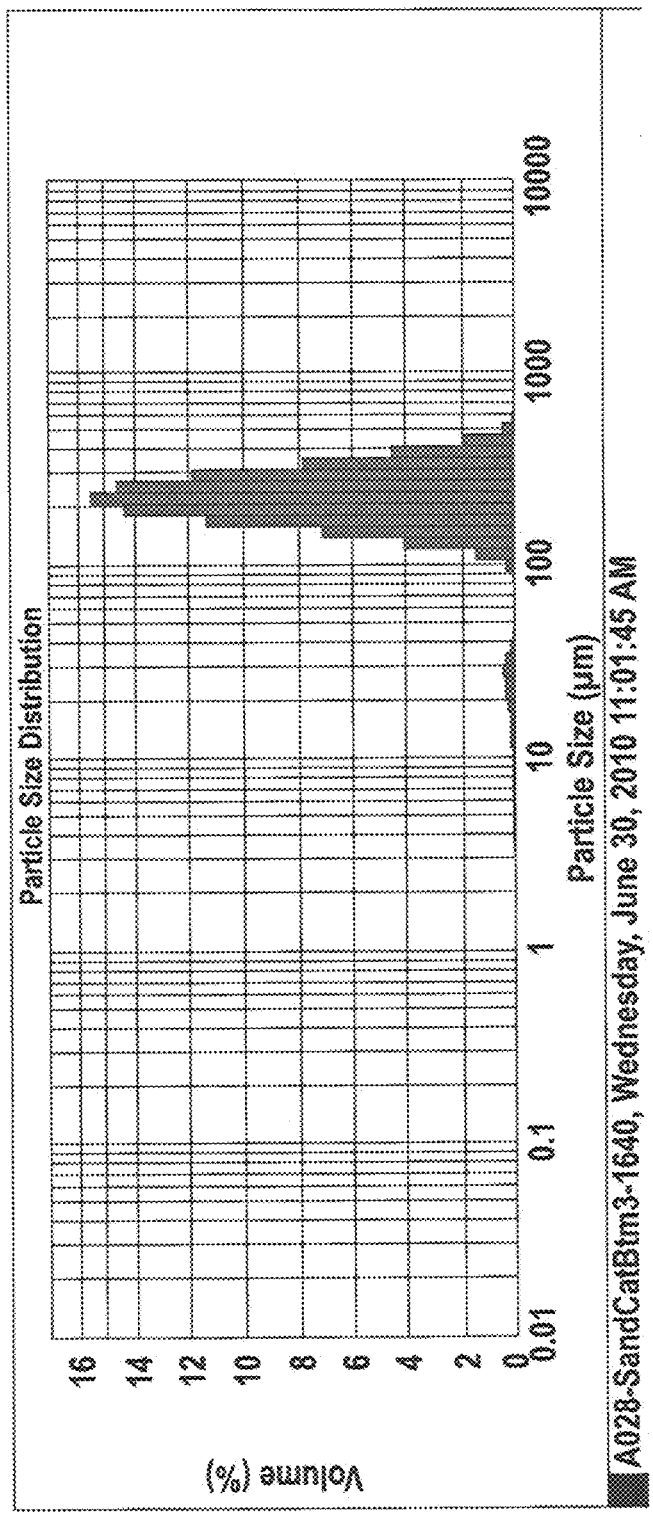

As illustrated by Table 7, it is clear that the solids captured by the secondary separator are smaller in size than those captured by the cyclone separator. Approximately 73% of all solids captured by the secondary separator are smaller than 300 microns in size, whereas only approximately 16% of all solids captured by the cyclone separator are smaller than 300 microns. In addition, approximately 4% of all solids captured by the secondary separator are smaller than 50 microns, while no particles smaller than 150 microns were captured by the cyclone separator. Recall from the description above, the largest counts of solid contaminants in synthetic crude oil products are those less than 50 microns in size. Therefore, this is evidence that the secondary separator is a major contributor in solid contaminant removal from the final liquid product. FIG. 13 and FIG. 14 illustrate histograms of particle size distribution of solids captured by a cyclone separator and the present secondary separator, according to one embodiment.

Figure 15:
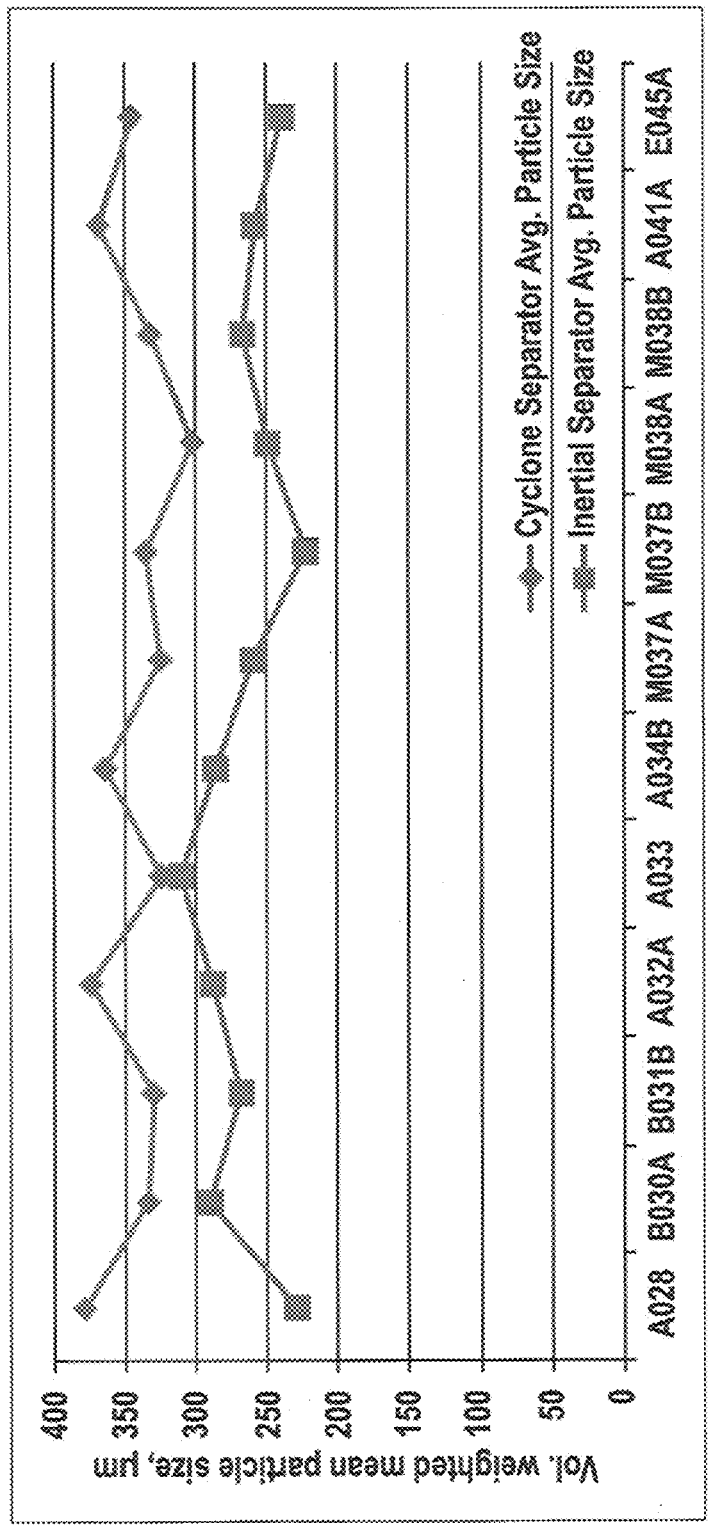
FIG. 15 illustrates the particle size trend for solids captured by a cyclone separator and the present secondary separator, according to one embodiment.

The same particle size discrepancy in solids captured by the cyclone separator 306 and the secondary separator 400 are shown in other runs as well. Table 8 compares the volume weighted mean particle size (Sauter diameter) of solids captured by the cyclone separator and the secondary separator, and FIG. 15 illustrates the particle size trend for all runs with available data.

TABLE 8

Volume weighted mean of solids captured.

| | Cyclone Separator Solids | | Secondary Separator Solids | |
|---|---|---|---|---|
| Run ID | Sample ID | Vol. Weighted Mean D[4,3], μm | Sample ID | Vol. Weighted Mean D[4,3], μm |
| A028 | A028-Sand Final-1637 | 378.349 | A028-Sand Catcher 3-1640 | 229.489 |
| B030.A | B030-SP-602-1742 | 333.087 | B030A-Sand Catcher-1777 | 289.910 |
| B031.B | B031B-SPV-602-1892 | 329.784 | B031B-SPV-504-1890 | 268.967 |
| A032.A | A032-SPV-602-1974 | 373.977 | A032-V504 Sand-1980 | 288.830 |
| A033 | A033-SP-0602-2015 | 324.762 | A033-Sand Catcher-2013 | 311.041 |
| A034.B | A034B-SP-602-2062 | 364.025 | A034-SP-504 Sand Catcher-2048 | 285.602 |
| M037.A | M037-SP-602-2190 | 324.858 | M037-V504-2196 | 260.264 |
| M037.B | M037B-SP-602-2211 | 335.306 | M037B-V504-2216 | 222.804 |
| M038.A | M038-SP-0602-2253 | 303.313 | M038A-Sand Catcher-2257 | 248.473 |
| M038.B | M038-SP-602-2283 | 332.432 | M038B-V504-2290 | 266.317 |
| A041.A | A041-SP-602-2479 | 368.267 | A041A-SP-504-2491 | 258.285 |
| E045.A | E045-SP-602-2871 | 345.108 | E045-SP-504-2875 | 239.176 |
| | Average | 342.772 | Average | 264.097 |

As shown in FIG. 15, the average size of particles captured by the secondary separator is consistently smaller than those captured by the cyclone separator. This is in agreement with the Run A028 findings shown in Table 7.

Heavy oil and bitumen feedstock can contain several troublesome, intractable, ultrafine, and fine solids. The fine solids are associated with the asphaltene fraction of the heavy oil and bitumen due to hydrocarbon coatings. The Athabasca formation is the largest of the major deposits of oil sands reserves. Athabasca Bitumen is the generic term for oil produced from the Athabasca formation. Heavy oils and bitumens are from relatively younger formations, and the Athabasca Bitumen provides a foundation for comparison with other heavy oils and bitumens, or any feedstock with solids.

Fine solids have been identified from the source formation, through on-site dewatering, and through refinery process as they are associated with the heavy fraction, that portion boiling above 1000 degF and contains asphaltenes. These feedstock solids pass through the reactor, the reactor cyclone, but are captured by the secondary separator. Sources of feedstock solids include:

(1) Solids that were incorporated at the time of the deposit of the formation and covered as petroleum formed and condensed around these small particles. These particles have coatings of toluene insoluble organic matter (TIOM) and are associated with the heaviest hydrocarbons, asphaltenes. These solids have diameters measured at less than 10 microns, and usually less than 5 microns diameters.

(2) Solids that were laid down at the same time as the source of the oil, inorganic ultra-fine and fine clays, sands, and other materials found in lacustrine and marine depositional environments. These solids have been measured at 10×200 nm. The solids have exposed inorganic areas, humic coated areas, and TIOM areas. With areas hydrophobic, and other areas hydrophilic, the ultrafine and fine solids appear at the interface of oil and microscopic water droplets. These solids make water removal difficult, and are associated with emulsions at oil-water interfaces.

(3) Solids that were added during production from including, but not limited to, drilling muds, fluids and additives, such as flow improvers, to enhance production, and reaction products of interactions of the drilling muds, fluids, additives, and the oil.

(4) Solids that came in with the production including pipe scale, rust, etc.

(5) Solids that were the precipitation product of asphaltenes and alkanes prior to delivery of feedstock for processing, these occur during production with the addition of light material for extraction, asphaltenes that are precipitated out on the side of the well bore when temperature and/or pressure is reduced, or in on-site pipe runs. Depending on the physical conditions and the asphaltenes, the decreased diameter due to deposition results in an increased velocity providing a shear force strong enough that precipitated asphaltenes do not deposit, but travel with oil to delivery.

In addition to the solids and asphaltenes from feedstock, these materials can agglomerate, and coagulate, creating larger particles. Thermal processing generates coke solids that are routed with the solid heat carrier to the regenerator. Studies have shown that the presence of solids and asphaltenes in crude oils can result in the build-up of foulant from the production wellbore through on-site dewatering, storage, and transportation to the refinery, through the refinery processes all the way to the coker laying deposits down in refinery heat exchangers, heaters, columns, tanks, and bottoms products including fuel oils. For a commercial refinery, where any interruption in production can be detrimental, an indicator of crude oil quality is the potential of fouling of the crude. Therefore, a desirable property is a decrease in fouling potential.

Figure 16:
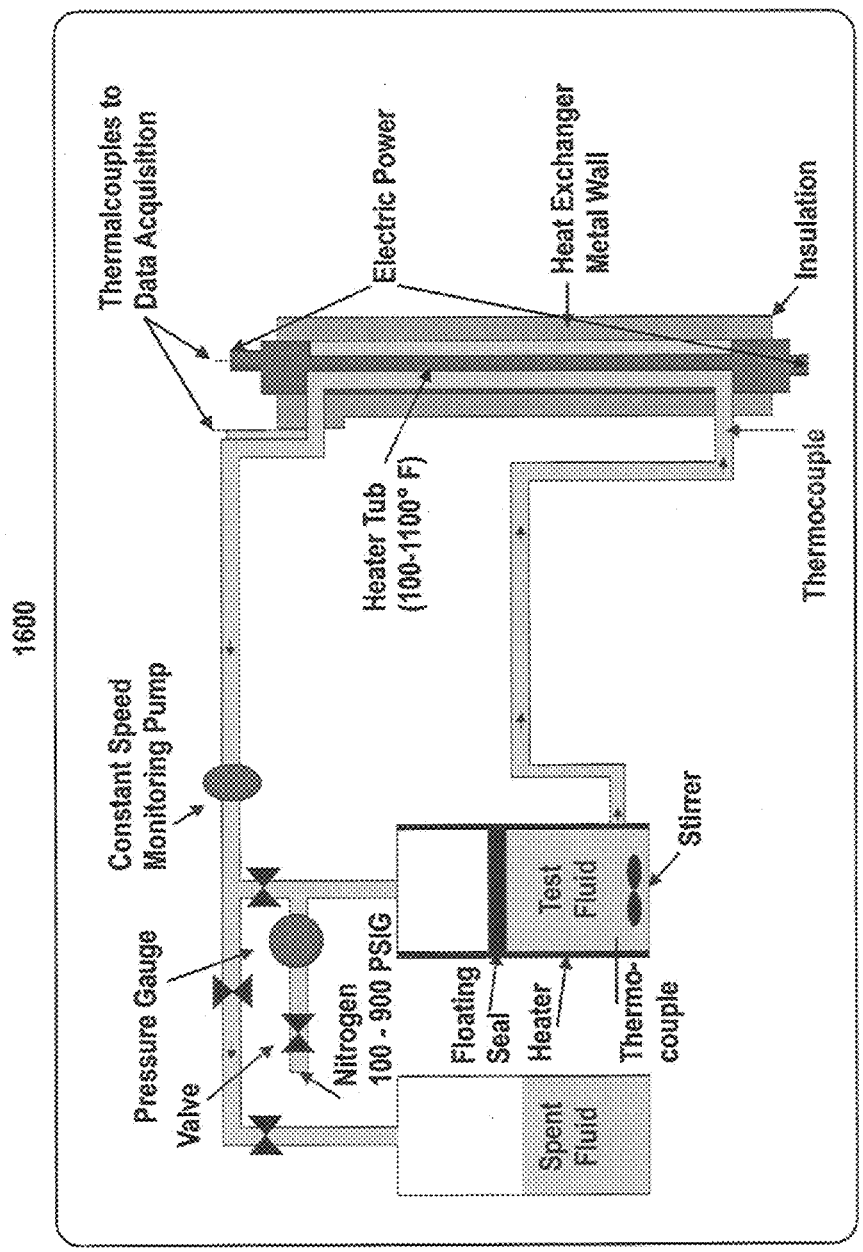
FIG. 16 illustrates a diagram of a prior art thermal fouling test unit.

FIG. 16 illustrates a diagram of a prior art thermal fouling test unit. To determine the fouling potential of the feedstock and product, a laboratory scale simulation of a refinery heat exchanger setup is conducted by F.A.C.T., a third-party company with proprietary equipment that quantifies the degree of fouling caused by the crude oil tested. The F.A.C.T. Thermal Fouling Test Unit 1600 pumps the crude oil tested through the annular section of a shell and tube heat exchanger that contains an electrically-heated tube for precise temperature settings. Thermocouples are placed to measure the temperature output of the heated tube and the temperature of the crude oil exiting the heat exchanger. Over the duration of a test run with the apparatus, fouling occurs on the surface of the heated tube.

The practical effect of fouling on a heat exchanger is inadequate heat exchange. In steady state and without fouling, the temperature of the heated tube and the crude oil exiting the heat exchanger should be very close. The foulant coated on the heat exchanger have far less thermal conductivity than the unfouled heated tube surface, therefore heat transfer to the crude oil is impeded when fouling occurs. This translates to a decrease in the temperature of the crude oil exiting the heat exchanger. In other words, the more fouling, the lower the temperature. Thus, the F.A.C.T. Thermal Fouling Test Unit quantifies the degree of fouling by measuring the change in temperature of the crude oil exiting the heat exchanger. Table 9, Table 10, and Table 11 compare the synthetic crude oil final product from pre-secondary separator Run A014 and post-secondary separator Runs A028, E043.A, E044, E045.A, and E046, with unprocessed Athabasca Bitumen and Exploratory Heavy Oil Sample (EHOS) whole crudes. EHOS (Exploratory Heavy Oil Sample) is a sample from an exploratory well that was provided for technology demonstration. The EHOS sample was from initial field production and unique to that activity and was from one sampling campaign. The EHOS sample is only representative of the sample itself. The secondary separator was first implemented in Run A028, and subsequently continued to be in service.

TABLE 9

F.A.C.T. fouling test results before secondary separator.

| Sample ID | FTF-ATH-053 | A014-SCO Large-784 |
|---|---|---|
| FOULING Δ T/° F. | | |
| 15 min | 0 | 25 |
| 30 min | 20 | 35 |
| 45 min | 39 | 54 |
| 60 min | 55 | 68 |
| 75 min | 64 | 79 |
| 90 min | 71 | 81 |
| 105 min | 72 | 84 |
| 120 min | 72 | 86 |
| 135 min | 72 | 86 |
| 150 min | — | — |
| 165 min | — | — |
| 180 min | — | — |

TABLE 10

F.A.C.T. fouling test results after secondary separator.

| Sample ID | FTF-ATH-053 | A028-SCO-1792 |
|---|---|---|
| FOULING Δ T/° F. | | |
| 15 min | 0 | 1 |
| 30 min | 20 | 10 |
| 45 min | 39 | 18 |
| 60 min | 55 | 29 |
| 75 min | 64 | 39 |
| 90 min | 71 | 48 |
| 105 min | 72 | 57 |
| 120 min | 72 | 68 |
| 135 min | 72 | — |
| 150 min | — | — |
| 165 min | — | — |
| 180 min | — | — |

TABLE 11

F.A.C.T. fouling test results after secondary separator.

| Sample ID | E046-SP-0135-2969 | E043A-SCO-2951 | E044-SCO-2950 | E045A-SCO-2949 | E046-SCO-3113 |
|---|---|---|---|---|---|
| FOULING Δ T/° F. | | | | | |
| 15 min | 2 | 2 | 0 | 0 | 0 |
| 30 min | 11 | 4 | 1 | 0 | 0 |
| 45 min | 14 | 5 | 2 | 0 | 0 |
| 60 min | 16 | 8 | 3 | 4 | 1 |
| 75 min | 18 | 10 | 3 | 7 | 1 |
| 90 min | 20 | 13 | 4 | 8 | 2 |
| 105 min | 22 | 17 | 4 | 9 | 3 |
| 120 min | 23 | 19 | 5 | 10 | 4 |
| 135 min | 23 | 19 | 5 | 10 | 4 |
| 150 min | — | — | — | — | — |
| 165 min | — | — | — | — | — |
| 180 min | — | — | — | — | — |

As shown in Table 9, without the service of the secondary separator, the process produced a synthetic crude oil product that has a slightly increased fouling potential (slightly increased ΔT values after the same elapsed time) than the Athabasca Bitumen whole crude that was processed in Run A014. This is to be expected as the volume of bitumen has been reduced, but the solids have not been removed. In contrast, as shown in Table 10, with the service of the secondary separator, the process produced a synthetic crude oil product that has a reduced fouling potential than the Athabasca Bitumen whole crude that was the feedstock in Run A028. This was the first shakedown run of the secondary separator, and performance improved as operational guidelines were implemented.

This reduction in fouling potential is also repeated in post-secondary separator runs that processed a different type of whole crude. As shown in Table 11, the process produced synthetic crude oil products that have vastly lower fouling potential than the Exploratory Heavy Oil Sample (EHOS) whole crude that was processed in Runs E043.A, E044, E045.A, and E046.

Figure 17:
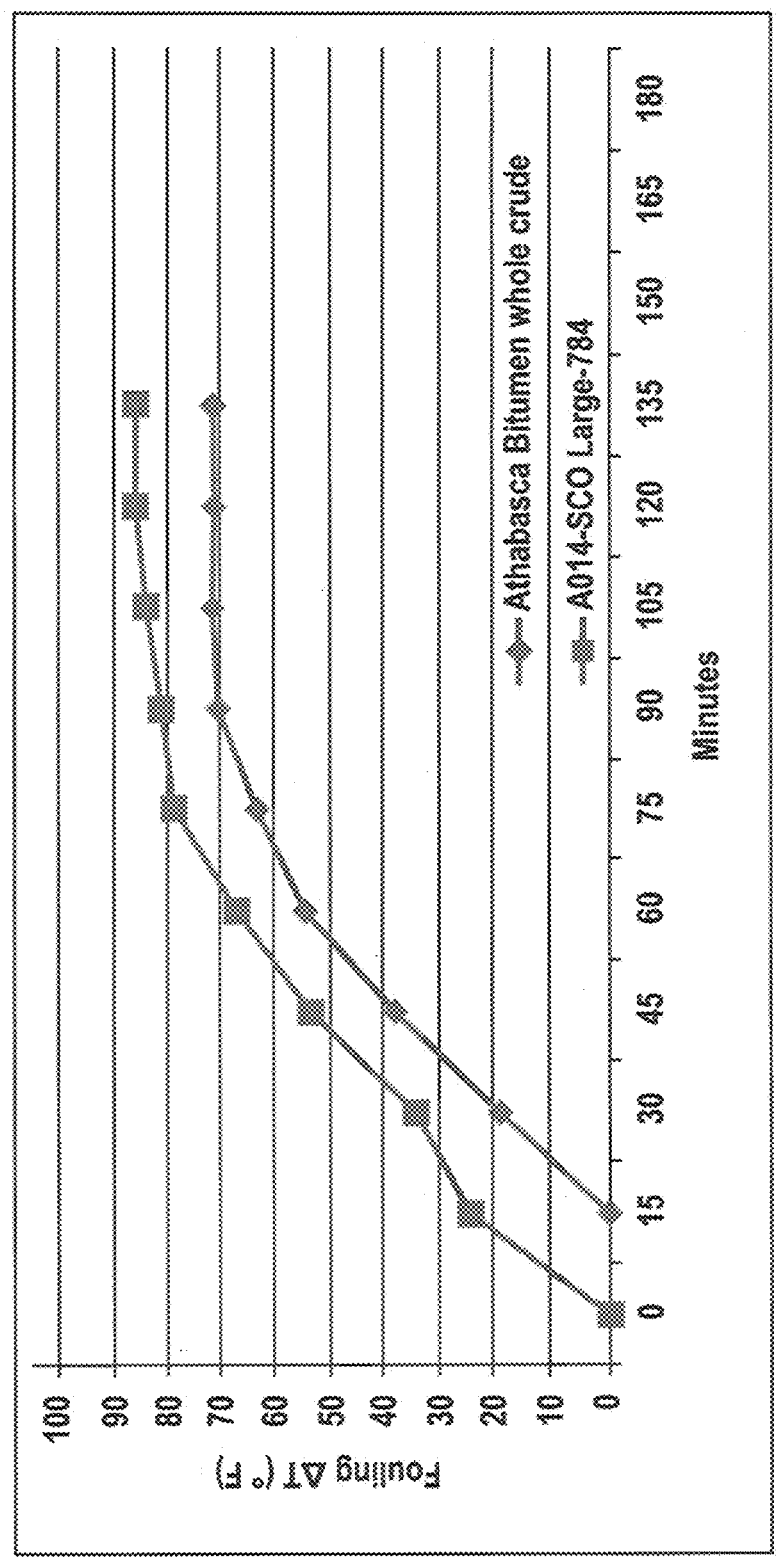
FIG. 17 illustrates exemplary fouling test results for an implementation without the present secondary separator.
Figure 18:
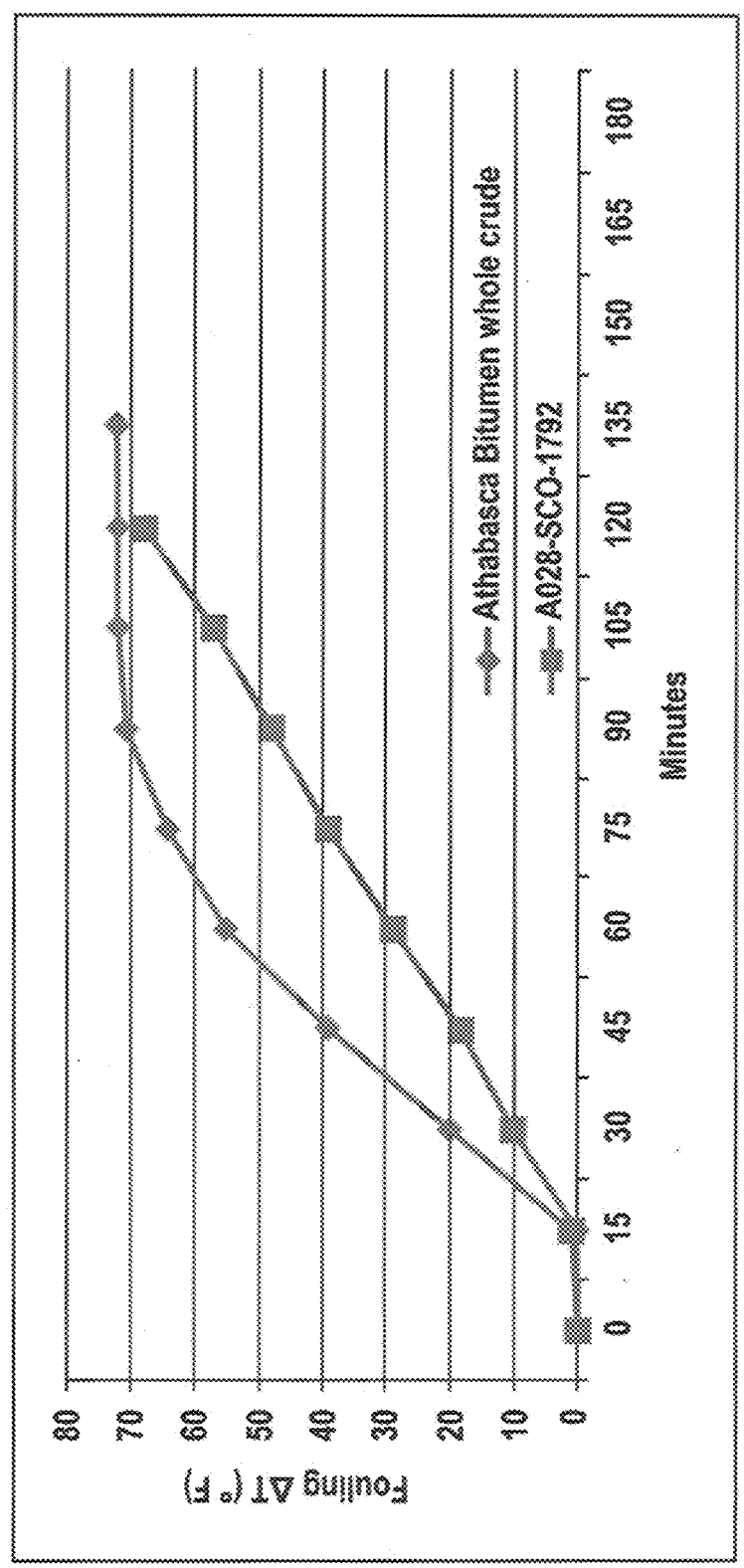
FIG. 18 illustrates exemplary fouling test results for an implementation with the present secondary separator, according to one embodiment.
Figure 19:
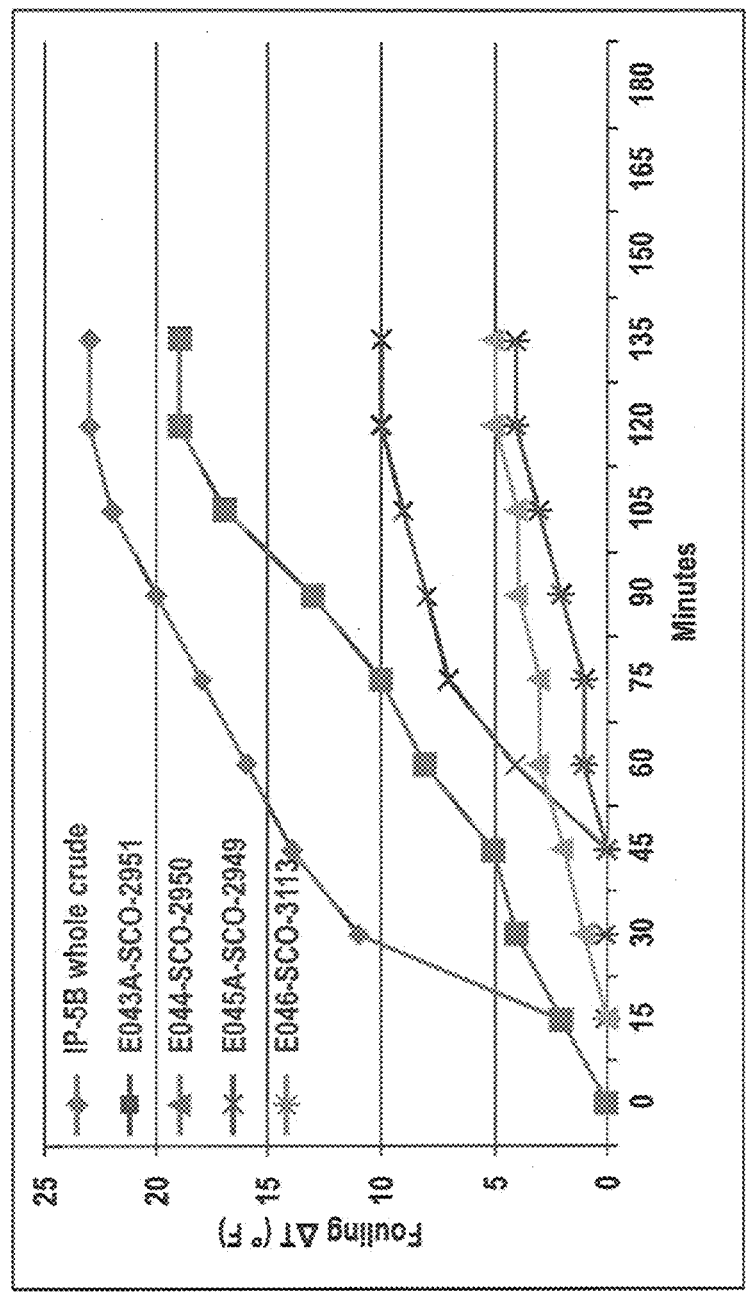
FIG. 19 illustrates further exemplary fouling test results for an implementation with the present secondary separator, according to one embodiment.

FIG. 17 illustrates exemplary fouling test results for an implementation without the present secondary separator. FIG. 18 illustrates exemplary fouling test results for an implementation with the present secondary separator, according to one embodiment. FIG. 19 illustrates further exemplary fouling test results for an implementation with the present secondary separator, according to one embodiment.

Aside from feedstock solids and asphaltenes that can cause fouling in refinery heat exchangers, there are other undesirable substances in crude oil that are best minimized. Metals, in particular Nickel and Vanadium, are one such undesirable substance. Nickel and Vanadium can potentially form chemical complexes that are detrimental to refinery processes. However, the present process removes such metals from the final liquid product, as the solid heat carrier provide a medium for these metals to be adsorbed and separated from the hydrocarbons. Consequently, by minimizing the amount of solid heat carrier in any downstream product vessels, the amount of metals in the final product can be reduced.

Table 12 shows the metal content data of synthetic crude oil and Reactor Feed based on ICP analysis. The raw synthetic crude oil ICP data suggest that the synthetic crude oil metal content of runs without the present secondary separator is lower than the synthetic crude oil metal content of runs with the present secondary separator. However, the raw Reactor Feed ICP data also suggest that the Reactor Feed metal content of runs without the secondary separator is higher than the Reactor Feed metal content of runs with the secondary separator. Therefore, it is not a fair assessment to compare the raw synthetic crude oil data from before and after secondary separator implementation. Instead, comparison must also be based on the preexisting amount of metals in the Reactor Feed. For this purpose, a synthetic crude oil metal content to Reactor Feed metal content ratio is established.

By comparing the SCO/Reactor Feed metal content ratio, there is indeed a lower amount of Nickel, Vanadium, and Calcium in synthetic crude oil products from post-secondary separator runs, per unit of preexisting Reactor Feed metal. This shows a greater degree of metal removal for runs with the secondary separator, as indicated by the lower synthetic crude oil metal content.

associated with bitumen have been reported as predominately nanosized, single layer aluminosilicate clay particles. Over geologic time, exteriors of these active, inorganic particles have been rendered asphaltene-like, owing to their exposure to highly aromatic, polar organic components from the oil sand deposit. Chemical interaction with the host surface renders the organic coatings solvent insoluble. These clay water particles may have been engulfed by oil, either as it migrated into the hydrocarbon deposit or during its geologic residence

TABLE 12

ICP metals data before and after secondary separator.

| | SCO ICP Data (ppm) | | | Reactor Feed ICP Data (ppm) | | | SCO/Reactor Feed Ratio | | |
|---|---|---|---|---|---|---|---|---|---|
| | Nickel | Vanadium | Calcium | Nickel | Vanadium | Calcium | Nickel | Vanadium | Calcium |
| Before Secondary Separator Implementation | | | | | | | | | |
| A014 | 14.9 | 35.7 | 481 | 137 | 362 | 3960 | 0.1088 | 0.0986 | 0.1215 |
| A016 | 8.49 | 22.8 | 435 | 127 | 334 | 28600 | 0.0669 | 0.0683 | 0.0152 |
| A017 | 12.9 | 36.0 | 269 | <2.00 | 358 | <20.0 | na | 0.1006 | na |
| A018 | 22.9 | 61.2 | 361 | 143 | 373 | 1110 | 0.1601 | 0.1641 | 0.3252 |
| A019 | 27.3 | 72.4 | 788 | 143 | 373 | 1110 | 0.1909 | 0.1941 | 0.7099 |
| A020.A | 19.5 | 59.0 | 88.8 | 94.4 | 247 | 825 | 0.2066 | 0.2389 | 0.1076 |
| A020.B | 21.0 | 43.2 | 15.6 | 128 | 340 | 1850 | 0.1641 | 0.1271 | 0.0084 |
| A022.A | 34.5 | 97.9 | 738 | 112 | 317 | 40400 | 0.308 | 0.3088 | 0.0183 |
| A022.B | 23.6 | 67.1 | 463 | 112 | 317 | 40400 | 0.2107 | 0.2117 | 0.0115 |
| A023 | 28.1 | 80.1 | 1570 | 99.1 | 277 | 37100 | 0.2836 | 0.2892 | 0.0423 |
| A024.A | 24.4 | 68.7 | 743 | 120 | 334 | 40600 | 0.2033 | 0.2057 | 0.0183 |
| A024.B | 5.78 | 16.5 | 36.2 | 120 | 334 | 40600 | 0.0482 | 0.0494 | 0.0009 |
| Average | 20.3 | 55.1 | 499 | 121 | 331 | 21505 | 0.1774 | 0.1714 | 0.1254 |
| After Secondary Separator Implementation | | | | | | | | | |
| A028 | 27.8 | 75.4 | 1030 | 125 | 340 | 41100 | 0.2224 | 0.2218 | 0.0251 |
| B030.A | 19.1 | 26.4 | 53.8 | 157 | 209 | 5310 | 0.1217 | 0.1263 | 0.0101 |
| B030.B | 31.1 | 38.8 | 60.9 | 154 | 208 | 7820 | 0.2019 | 0.1865 | 0.0078 |
| B031.A | 40.4 | 45.3 | 230 | 169 | 215 | 15600 | 0.2391 | 0.2107 | 0.0147 |
| B031.B | 22.1 | 25.6 | 1550 | 161 | 208 | 26300 | 0.1373 | 0.1231 | 0.0589 |
| A032.B | 27.2 | 70.8 | 129 | 166 | 418 | 6040 | 0.1639 | 0.1694 | 0.0214 |
| U035 | 11.2 | 68.6 | 38.2 | 164 | 823 | 265 | 0.0683 | 0.0834 | 0.1442 |
| U036.A | 39.2 | 205 | 84.7 | 170 | 866 | 344 | 0.2306 | 0.2367 | 0.2462 |
| U036.B | 19.2 | 105 | 191 | 162 | 853 | 7870 | 0.1185 | 0.1231 | 0.0243 |
| U037.A | 29.6 | 170 | 199 | 159 | 824 | 14800 | 0.1862 | 0.2063 | 0.0134 |
| U037.B | 10.2 | 72.2 | 25.1 | 158 | 851 | 21400 | 0.0646 | 0.0848 | 0.0012 |
| U038.A | 33.0 | <19.8 | 687 | 153 | 781 | 27700 | 0.2157 | na | 0.0248 |
| E043.A | 47.5 | 150 | 134 | 193 | 636 | 12000 | 0.2461 | 0.2358 | 0.0112 |
| E043.B | 37.7 | 121 | 369 | 208 | 688 | 29400 | 0.1813 | 0.1759 | 0.0126 |
| E044.A | 38.1 | 119 | 195 | 215 | 702 | 20300 | 0.1772 | 0.1695 | 0.0096 |
| E045.A | 38.2 | 114 | 2070 | 183 | 607 | 67800 | 0.2087 | 0.1878 | 0.0305 |
| E045.B | 25.1 | 79.2 | 1950 | 183 | 607 | 67800 | 0.1372 | 0.1305 | 0.0288 |
| Average | 29.2 | 92.9 | 529 | 169 | 579 | 21873 | 0.1718 | 0.1670 | 0.0403 |

In the production of bitumen from oil sands, and other crudes with a density higher than water, a naphtha diluent is used to extract and reduce the bulk density to be lower than water through the dewatering system so that oil is on top, and water can be withdrawn. The naphtha diluent is removed by atmospheric topping, and sent back to production, while the bitumen is sent to shipment storage. After diluent removal, some intractable solids and water still remain with the bitumen. The major constituent of these residual solids is ultrafine, alumino-silicate clay crystallites with surfaces coated by toluene insoluble organic matter. Mineral solids and salt remain with the topped bitumen and during bitumen processing; they may be entrained with volatile overheads and carry over to other process units. The high chloride content of the salt residue causes corrosion and fouling problems in downstream processing units. Because of the amount and type of organic matter associated with the bitumen feedstock solids component, it is a major contributor to coke formation both in reactor vessels and on catalysts. Also, entrainment of the feedstock solid particles is known to cause fouling in pretreatment filters and packed-bed hydrotreaters. The solids in place. Consequently, even in a commercial process to remove solids and water by centrifugation, some ultrafine particles still remain with the coker feed bitumen. During bitumen processing, some of the particles are entrained with the volatile overheads. Consequently, the bitumen solids could contribute to coke formation in unexpected areas of the process. The solids prefer to remain associated with the asphaltene component because of the similarity between the adsorbed organics on their surfaces and the asphaltene itself.

Removal of the feedstock fine solids by filtration is very difficult due to the size and association with asphaltenes. To remove the solids for laboratory analyses, ultra high centrifugation was performed, centrifuging toluene asphaltene solutions at rotational speed resulting in over 350,000 gravities. Feedstock solids separation increased as the centrifugation speed was raised. An experiment that removed the solids using tailored solvent systems resulted in liquid recovery dropping to 85%, with a corresponding increase of cost and waste, was insufficient for consideration.

As described, the fine and ultrafine feedstock solids cause fouling of pipelines, upgrading and refinery processes. The feedstock solids generally follow the path of the asphaltene fraction and are found in vacuum tower gas oils and vacuum tower bottoms which are routed to coker feeds, heavy oil hydroprocessing, fuel oil, or synthetic crude oil blending.

It is well known that feedstock solids associated with the heavy fraction containing asphaltenes are the cause of fouling, and detected in fouling test procedures.

The present system removes a portion of the feedstock solids and reduces the fouling factor of the blended stream, in this case Synthetic Crude Oil (SCO).

State-of-the-art measurement systems were used herein to detect and analyze fine solids associated with the Athabasca Bitumen feedstock. The solids were visually confirmed by microscopic photos, and a median particle size of less than 5 micron was confirmed by FBRM (Focused Beam Reflectance Measurement).

Figure 20:
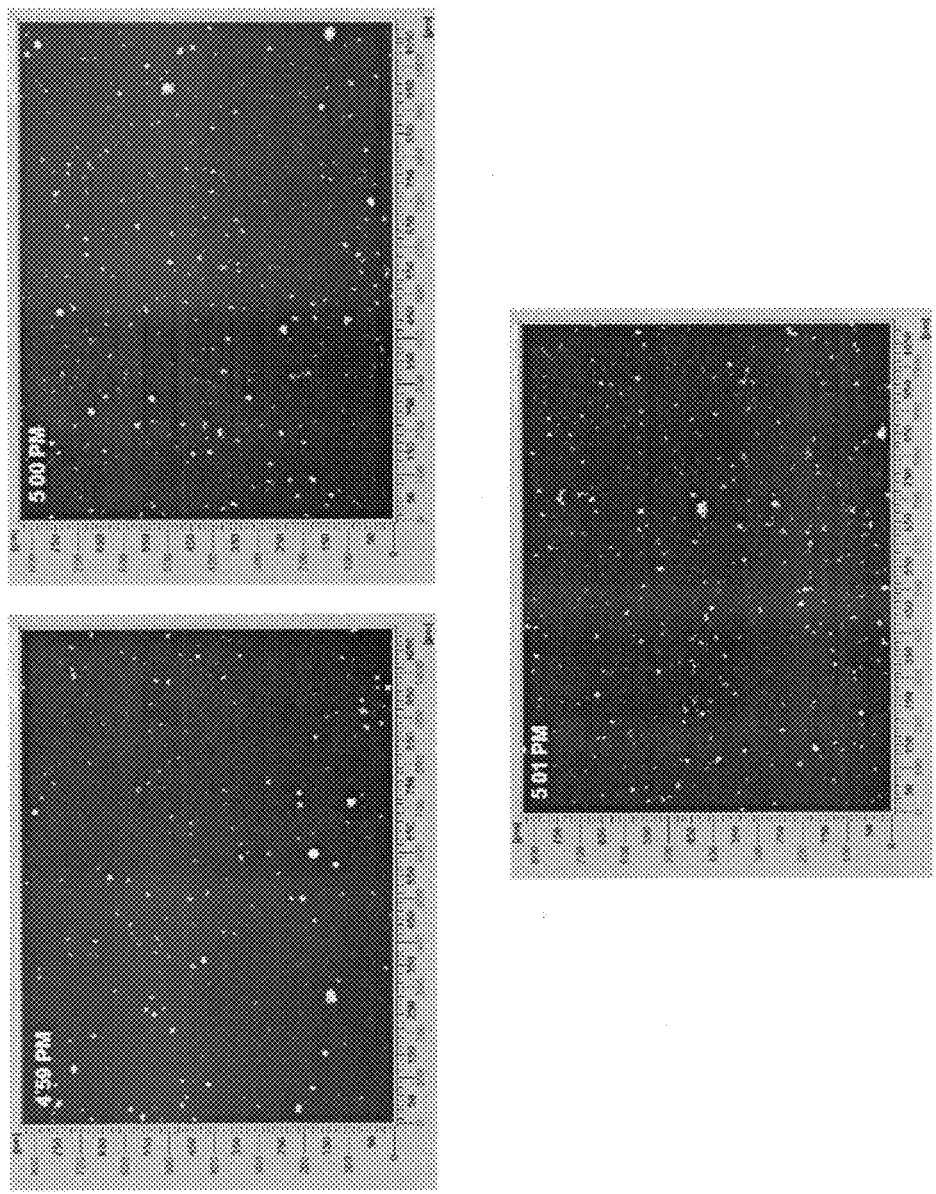
FIG. 20 illustrates microscopic images of solids circulating in the Athabasca Bitumen feedstock.
Figure 21:
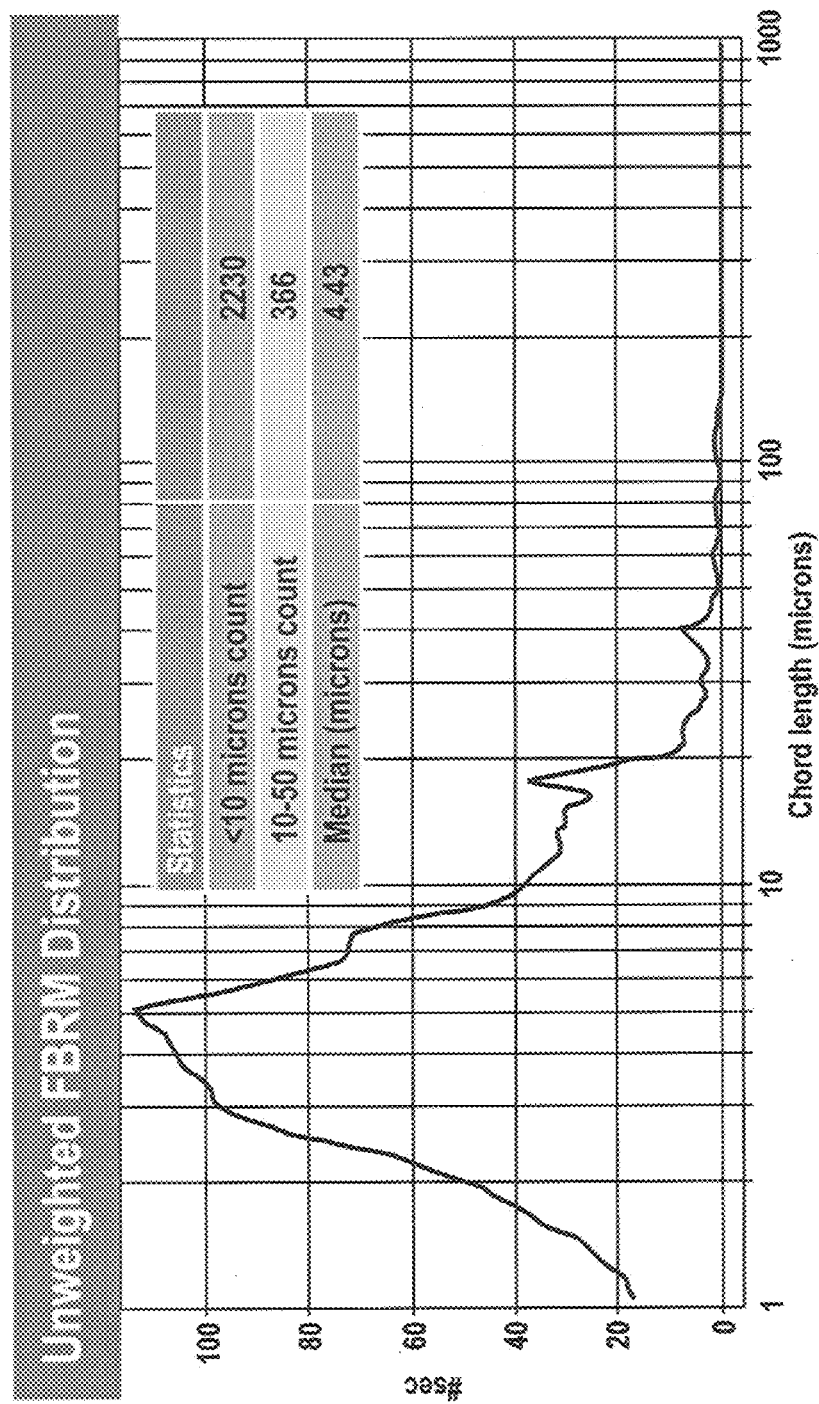
FIG. 21 illustrates a FBRM (Focused Beam Reflectance Measurement) graph of the size of particles in Athabasca Bitumen feedstock.

FIG. 20 provides microscopic images of solids circulating in the crude oil. FIG. 21 illustrates a FBRM (Focused Beam Reflectance Measurement) graph of the size of particles in solution. Consistent with the microscopic image of FIG. 20, small fines are measured by FBRM with a distribution mode of less than 5 microns.

Figure 22:
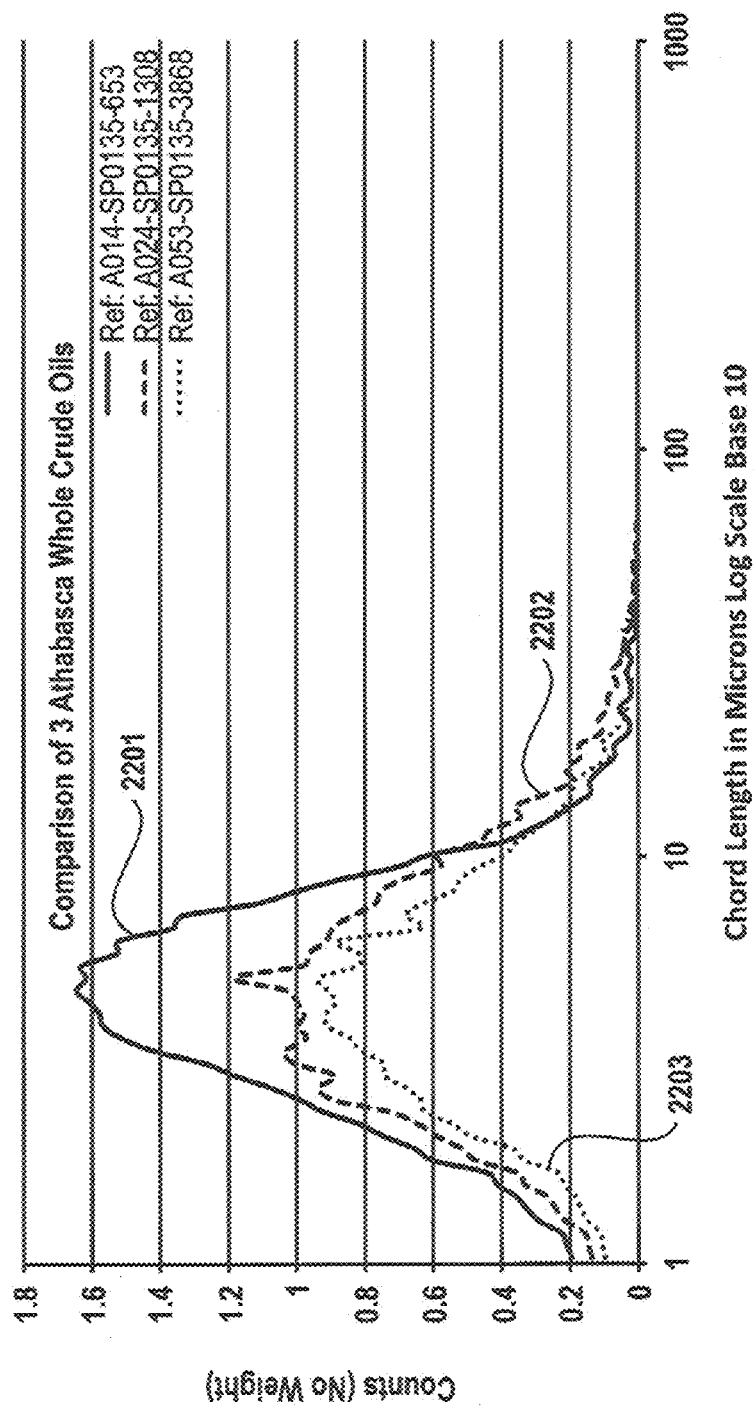
FIG. 22 illustrates a FBRM comparison of 3 Athabasca Bitumen shipments.

FIG. 22 illustrates a FBRM comparison of 3 separate Athabasca Bitumen shipments. Shipment 1 is illustrated by line 2201, sample A014-SP0135-653. Shipment 2 is illustrated by line 2202, sample A024-SP0135-1308. Shipment 3 is illustrated by line 2203, sample A053-SP0135-3868. The FBRM run conditions were 65° C., with the rpm setting at 1:00. All Athabasca Bitumen shipments contained fine solids with a median less than 5 micron. It is apparent there is a noticeable difference in the small particulate solids present in each of the shipments with the greatest difference shown in Shipment 1 2201. Such differences are likely due to the particular wells producing from particular depths in particular formations, or due to dewatering, naphtha recovery, or other operational differences, or due to trim blending to product specification.

In the description above, for purposes of explanation only, specific nomenclature is set forth to provide a thorough understanding of the present disclosure. However, it will be apparent to one skilled in the art that these specific details are not required to practice the teachings of the present disclosure.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

A method, system, and apparatus for separation in processing of feedstocks have been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

What is claimed is:

1. An apparatus, comprising:
a tubular vessel lacking a conical portion having a square pipe entry and a vapor outlet, wherein the vapor outlet is positioned at the top of the tubular vessel, and wherein the square pipe entry is tangential to an inner diameter of the tubular vessel;
a barrel positioned below the tubular vessel;
a double isolation knife valve positioned between the tubular vessel and the barrel,
a cyclone separator disposed upstream from the tubular vessel, wherein the cyclone separator produces a stream of gas and solids;
a quench vessel disposed downstream from the vapor outlet of the tubular vessel; and
wherein a stream of gas and solids enters the tubular vessel through the square pipe entry, and wherein the gas and solids are separated by using centrifugal force, and wherein the gas exits the vapor outlet and the solids are collected in the barrel.

2. The apparatus of claim 1, wherein the barrel is removable for emptying collected solids.

3. A method, comprising:
providing a secondary separation apparatus, the secondary separation apparatus comprising
a tubular vessel lacking a conical portion having a square pipe entry and a vapor outlet, wherein the vapor outlet is positioned at the top of the tubular vessel, and wherein the square pipe entry is tangential to an inner diameter of the tubular vessel;
a barrel positioned below the tubular vessel; and
a double isolation knife valve positioned between the tubular vessel and the barrel;
positioning the secondary separation apparatus downstream of a cyclone separator, wherein a stream of gas and solids from the cyclone separator enters the tubular vessel through the square pipe entry, and wherein the gas and solids are separated by using centrifugal force, and wherein the solids are collected in the barrel, and
positioning the secondary separation apparatus upstream of a quench vessel, wherein the gas exits the vapor outlet and continues to the quench vessel.

4. The method of claim 3, further comprising removing the barrel and emptying collected solids.

* * * * *